US012340756B2

(12) United States Patent
Lee et al.

(10) Patent No.: US 12,340,756 B2
(45) Date of Patent: Jun. 24, 2025

(54) DISPLAY APPARATUS

(71) Applicant: SAMSUNG DISPLAY CO., LTD., Yongin-si (KR)

(72) Inventors: Jaewoo Lee, Yongin-si (KR); Taeho Kim, Yongin-si (KR); Seungjun Lee, Yongin-si (KR); Yongsu Lee, Yongin-si (KR); Seunghwan Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/494,014

(22) Filed: Oct. 25, 2023

(65) Prior Publication Data

US 2024/0153463 A1 May 9, 2024

(30) Foreign Application Priority Data

Nov. 3, 2022 (KR) ........................ 10-2022-0145563

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0852* (2013.01); *G09G 2310/0202* (2013.01); *G09G 2310/0205* (2013.01); *G09G 2310/0213* (2013.01); *G09G 2310/08* (2013.01); *G09G 2320/0233* (2013.01); *G09G 2320/045* (2013.01); *G09G 2330/021* (2013.01)

(58) Field of Classification Search
CPC ............... G09G 3/3266; G09G 3/3233; G09G 2300/0819; G09G 2300/0852; G09G 2310/0205; G09G 2310/0213; G09G 2310/08; G09G 2310/0202; G09G 2320/0233; G09G 2320/045; G09G 2330/021
USPC .......................................................... 345/214
See application file for complete search history.

(56) References Cited

U.S. PATENT DOCUMENTS

| | | | | |
|---|---|---|---|---|
| 10,878,756 | B1 * | 12/2020 | Lu | G09G 3/3291 |
| 10,950,153 | B2 | 3/2021 | Zhao et al. | |
| 11,087,685 | B1 * | 8/2021 | Lu | G09G 3/3233 |
| 11,114,030 | B1 * | 9/2021 | Lu | G09G 3/3233 |
| 2015/0123883 | A1 * | 5/2015 | Lin | G09G 3/3233 345/76 |
| 2020/0058250 | A1 * | 2/2020 | Dong | G09G 3/3225 |
| 2020/0135105 | A1 * | 4/2020 | Lu | H01L 27/1214 |
| 2020/0135106 | A1 * | 4/2020 | Lu | H01L 27/1255 |
| 2020/0143752 | A1 * | 5/2020 | Jung | G09G 3/3266 |

(Continued)

FOREIGN PATENT DOCUMENTS

| | | |
|---|---|---|
| CN | 106898292 | 6/2017 |
| CN | 111583866 | 8/2020 |

*Primary Examiner* — Tom V Sheng
(74) *Attorney, Agent, or Firm* — F. CHAU & ASSOCIATES, LLC

(57) ABSTRACT

A display apparatus according to an embodiment includes a gate driving circuit configured to sequentially output gate signals during a compensation period of a frame period, in which a threshold voltage of a driving transistor is compensated, wherein a gate signal output by each of a plurality of stages is simultaneously supplied to gate lines arranged in two or more rows corresponding thereto.

18 Claims, 22 Drawing Sheets

(56) References Cited

U.S. PATENT DOCUMENTS

| | | | | |
|---|---|---|---|---|
| 2021/0335233 | A1* | 10/2021 | Chen .................... | G09G 3/3275 |
| 2021/0390904 | A1* | 12/2021 | Xuan ................... | G09G 3/3225 |
| 2022/0139301 | A1* | 5/2022 | Kim ..................... | G09G 3/3233<br>345/690 |
| 2022/0139312 | A1 | 5/2022 | Bai et al. | |
| 2022/0335901 | A1 | 10/2022 | Zhang et al. | |
| 2023/0215316 | A1* | 7/2023 | Baek ........................ | G09G 3/20<br>345/214 |

* cited by examiner

DISPLAY APPARATUS

CROSS-REFERENCE TO RELATED APPLICATION

This application is based on and claims priority under 35 U.S.C. § 119 to Korean Patent Application No. 10-2022-0145563, filed on Nov. 3, 2022, in the Korean Intellectual Property Office, the disclosure of which is incorporated by reference herein in its entirety.

FIELD

This disclosure relates generally to a gate driving circuit and a display apparatus including the same.

DESCRIPTION OF THE RELATED ART

A display apparatus includes a pixel portion, a gate driving circuit, a data driving circuit, control circuitry, etc., where the pixel portion includes a plurality of pixels. The gate driving circuit includes stages connected to gate lines, and the stages are configured to supply gate signals to the gate lines connected thereto.

SUMMARY

Embodiments herein relate to a display apparatus with a reduced dead space, less circuit complexity, and/or reduced power consumption as compared to related art display devices having threshold voltage compensation circuitry and associated gate driving circuitry.

According to one or more embodiments, a display apparatus includes: a plurality of first gate lines respectively arranged in a plurality of rows; a plurality of second gate lines respectively arranged in the plurality of rows; a first gate driving circuit including a plurality of first stages, wherein the plurality of first stages are configured to sequentially output first gate signals during a write-period of a frame period, in which data signals are applied; and a second gate driving circuit including a plurality of second stages, wherein the plurality of second stages are configured to sequentially output second gate signals during a compensation period in the frame period, in which a threshold voltage of a driving transistor is compensated. Each of the plurality of first stages corresponds to one row, each of the plurality of second stages corresponds to two or more rows, and a second gate signal output by each of the plurality of second stages is simultaneously supplied to the second gate lines arranged in two or more rows corresponding thereto.

In various options:

In the one frame period, the write-period may be subsequent to the compensation period, and an interval between the second gate signal and the first gate signal may be 4 horizonal periods (H) or more.

In two or more rows corresponding to the second stage, intervals of first gate signal supplied to the first gate line and second gate signal supplied to the second gate line are different from each other.

Each of the plurality of second stages may correspond to three rows, and the second gate signal may have an on-time of 3 horizontal periods (H), is shifted by 3H between adjacent second stages, and then output.

The first gate signal may have an on-time of 1H, and is shifted by an interval of 1H, and then output.

The display apparatus may further include a pair of clock lines connected to the second stages.

The display apparatus may further include a plurality of pixels respectively arranged in the plurality of rows, wherein each of the plurality of pixels may include: a driving transistor; a first transistor including a gate connected to the first gate line, the first transistor being connected to a data line; and a second transistor including a gate connected to the second gate line, the second transistor being connected between a gate of the driving transistor and one terminal of the driving transistor.

The display apparatus may further include a plurality of third gate lines respectively arranged in the plurality of rows, wherein the plurality of second stages may be configured to sequentially output third gate signals during a first initialization period of one frame period, in which a gate of a driving transistor is initialized, and a third gate signal output by each of the plurality of second stages may be simultaneously supplied to third gate lines arranged in two or more rows corresponding thereto.

In the one frame period, the compensation period may be subsequent to the first initialization period.

The display apparatus may further include a plurality of fourth gate lines respectively arranged in the plurality of rows, wherein the plurality of second stages may be configured to sequentially output fourth gate signals during a second initialization period of one frame period, in which a light-emitting diode is initialized, and a fourth gate signal output by each of the plurality of second stages may be simultaneously supplied to the fourth gate lines arranged in two or more rows corresponding thereto.

During the one frame period, a fourth gate signal output in the second initialization period may overlap a second gate signal output in the compensation period.

The display apparatus may further include: a plurality of fifth gate lines respectively arranged in the plurality of rows; and a third gate driving circuit including a plurality of third stages, wherein the plurality of third stages are configured to sequentially output fifth gate signals during a light-emission period in one frame period, wherein each of the plurality of third stages may correspond to two or more rows, and a fifth gate signal output by each of the plurality of third stages may be simultaneously supplied to the fifth gate lines arranged in two or more rows corresponding thereto.

The display apparatus may further include: a plurality of fourth gate lines respectively arranged in the plurality of rows; and a third gate driving circuit including a plurality of third stages, wherein the plurality of third stages are configured to sequentially output fourth gate signals during a second initialization period of one frame period, in which a light-emitting diode is initialized, wherein each of the plurality of third stages may correspond to two or more rows, and a fourth gate signal output by each of the plurality of third stages may be simultaneously supplied to fourth gate lines arranged in two or more rows corresponding thereto.

The display apparatus may further include: a plurality of third gate lines respectively arranged in the plurality of rows; and a third gate driving circuit including a plurality of third stages, wherein the plurality of third stages are configured to sequentially output third gate signals during a first initialization period of one frame period, in which a gate of the driving transistor is initialized, wherein each of the plurality of third stages may correspond to two or more rows, and a third gate signal output by each of the plurality of third stages may be simultaneously supplied to third gate lines arranged in two or more rows corresponding thereto.

The display apparatus may further include a plurality of fourth gate lines respectively arranged in the plurality of rows, wherein the plurality of third stages may be configured to sequentially output fourth gate signals during a second initialization period of one frame period, in which a light-emitting diode is initialized, and a fourth gate signal output by each of the plurality of third stages may be simultaneously supplied to the fourth gate lines arranged in two or more rows corresponding thereto.

According to one or more embodiments, a display apparatus includes: a plurality of first gate lines respectively arranged in a plurality of rows; a plurality of second gate lines respectively arranged in the plurality of rows; a plurality of third gate lines respectively arranged in the plurality of rows; a first gate driving circuit including a plurality of first stages, wherein the plurality of first stages are configured to sequentially output first gate signals during a write-period of one frame period, in which data signals are applied; a second gate driving circuit including a plurality of second stages, wherein the plurality of second stages are configured to sequentially output second gate signals during a compensation period of one frame period, in which a threshold voltage of a driving transistor is compensated; and a third gate driving circuit including a plurality of third stages, wherein the plurality of third stages are configured to sequentially output third gate signals during a light-emission period of one frame period. Each of the plurality of first stages corresponds to one row, each of the plurality of second stages corresponds to two or more rows, each of the plurality of third stages corresponds to two or more rows, a second gate signal output by each of the plurality of second stages is simultaneously supplied to the second gate lines arranged in two or more rows corresponding thereto, and a third gate signal output by each of the plurality of third stages is simultaneously supplied to the third gate lines arranged in two or more rows corresponding thereto.

A number of rows to which each of the plurality of second stages corresponds may be greater than a number of rows to which each of the plurality of third stages corresponds.

A number of rows to which each of the plurality of second stages corresponds may be equal to a number of rows to which each of the plurality of third stages corresponds.

The display apparatus may further include a plurality of fourth gate lines respectively arranged in the plurality of rows, wherein the plurality of second stages may be configured to sequentially output fourth gate signals during a first initialization period of one frame period, in which a gate of a driving transistor is initialized, and a fourth gate signal output by each of the plurality of second stages may be simultaneously supplied to the fourth gate lines arranged in two or more rows corresponding thereto.

The display apparatus may further include a plurality of fifth gate lines respectively arranged in the plurality of rows, wherein the plurality of second stages may be configured to sequentially output fifth gate signals during a second initialization period of one frame period, in which a light-emitting diode is initialized, and a fifth gate signal output by each of the plurality of second stages may be simultaneously supplied to the fifth gate lines arranged in two or more rows corresponding thereto.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
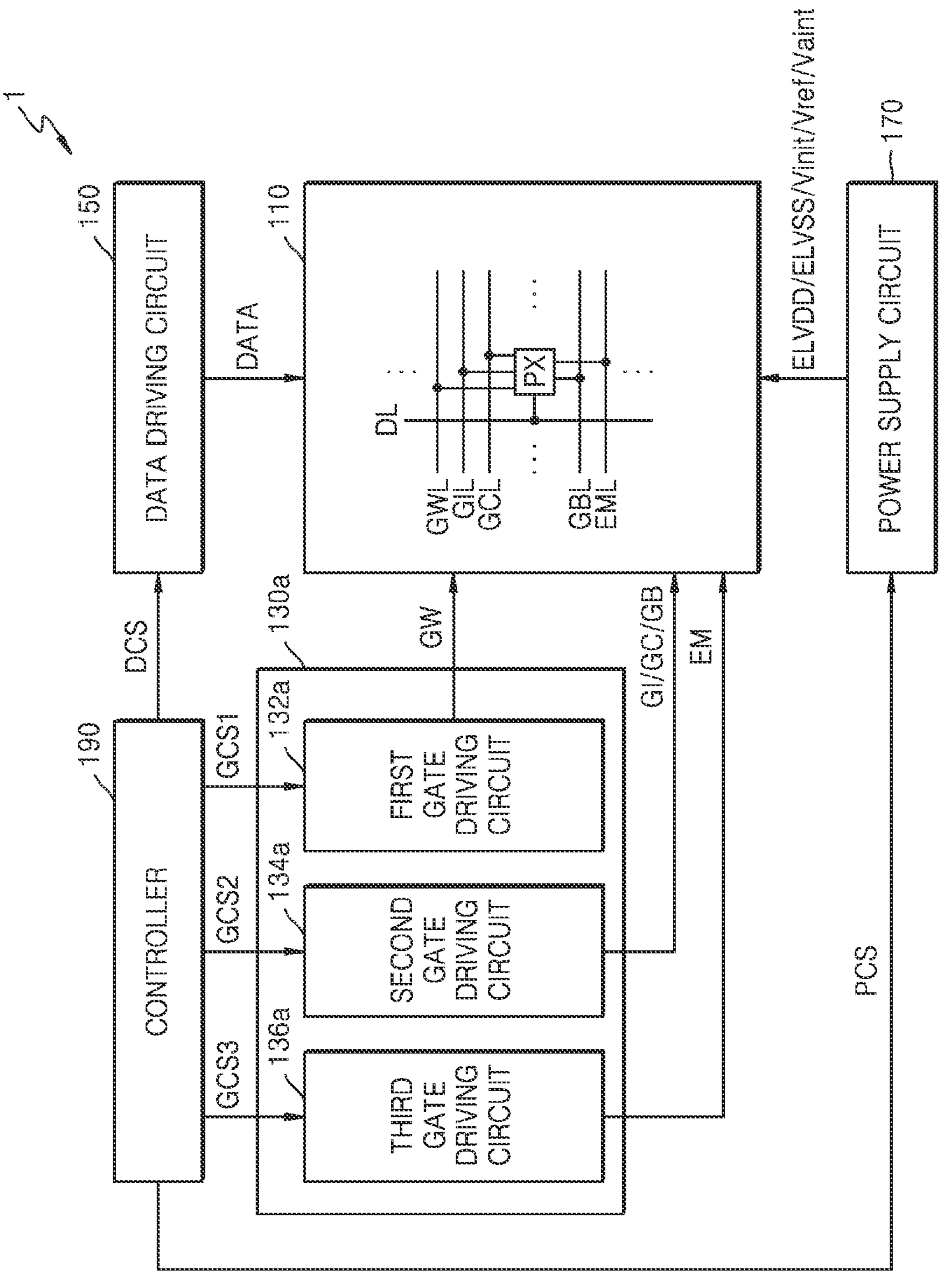
FIG. 1 is a schematic view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Herein, when a circuit element or signal is first introduced with a name and a legend, the circuit element or signal may later be referred to interchangeably with a shortened version of the name or with just the legend. For instance, a "first transistor T1" may subsequently be referred to as just "transistor T1" or just "T1".

Herein, the phrase, "a threshold voltage of a driving transistor is compensated" or like phrases may mean that threshold compensation circuitry supplies voltage/current to the driving transistor to change an overall circuit action or inaction that is due to an uncompensated threshold voltage for the driving transistor.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or elements but do not preclude the addition of one or more other features or elements.

Sizes of elements in the drawings may be exaggerated or reduced for convenience of explanation. As an example, the size and thickness of each element shown in the drawings are arbitrarily represented for convenience of description, and thus, the disclosure is not necessarily limited thereto.

Herein, when an arbitrary signal is said to be supplied, it may mean that an on-voltage (e.g., a low-level voltage) is supplied, and when an arbitrary signal is not supplied, it may mean that an off-voltage (e.g., a high-level voltage) is supplied.

As used herein, when a wiring is referred to as "extending in a first direction or a second direction", it means that the wiring not only extends in a straight line shape but also extends in a zigzag or in a curve in the first direction or the second direction.

In embodiments below, when it is described that a first element "X" is connected to a second element "Y", X may be electrically connected to Y, X may be functionally connected to Y, or X may be "directly connected" to Y (which in the latter case may be exemplified in circuit schematics herein showing X and Y directly connected to a common circuit node). Here, X and Y may be objects (e.g., apparatuses, circuit elements, circuits, wirings, electrodes, terminals, conductive layers, layers, and the like). Accordingly, the connection relationships between X and Y are not limited to connection relationships shown and made in the drawings and the detailed description.

Herein, when X is said to be electrically connected to Y, the connection configuration may include the case where at least one element (e.g., a switch, a transistor, a capacitance element, an inductor, a resistance element, a diode, and the like) enabling electrical connection between X and Y is connected between X and Y.

In embodiments below, "ON" used in association with an element state may denote an active state of an element, and "OFF" may denote an inactive state of an element. "ON" used in association with a signal received by an element may denote a signal activating the element, and "OFF" may denote a signal inactivating the element. An element may be activated by a high-level voltage or a low-level voltage. As an example, a P-channel transistor may be activated by a low-level voltage, and an N-channel transistor may be activated by a high-level voltage. Accordingly, it should be understood that "ON" voltages for a P-channel transistor and an N-channel transistor are opposite (low vs. high) voltage levels.

FIG. 1 is a schematic plan view of a display apparatus, 1, according to an embodiment. The display apparatus 1 may include a pixel portion 110, a gate driving circuit 130*a*, a data driving circuit 150, a power supply circuit 170, and a controller 190.

Briefly, the display apparatus 1 and other embodiments of display apparatus described later (e.g., display apparatus 1' and 1" of FIGS. 14 and 16) advantageously employ a grouping connection between one or more certain gate driving stages and corresponding pixel rows. This technique may reduce the number of circuits and wiring complexity as compared to related art display devices, with negligible or substantially negligible effect on image display quality. Thus, instead of providing a plurality N gate driving stages of a particular type of gate driving circuit (e.g., stages within a second gate driving circuit 134*a* and/or a third gate driving circuit 136*a* of FIG. 1) to supply a control signal at different timings to N rows of pixels, only N/X gate driving stages (X≥2) are included. Each of the N/X gate driving stages may supply the same control signal to X rows of pixels simultaneously, thereby significantly reducing the circuit complexity of the display apparatus, yet achieving the same or substantially the same image quality.

A plurality of pixels PX may be arranged in the pixel portion 110. The plurality of pixels PX may be arranged in various configurations such as a stripe configuration, a pentile configuration, a diamond configuration, a mosaic configuration, and the like to display images. The pixel portion 110 may be arranged in a display area of a substrate. Each pixel PX may include an organic light-emitting diode OLED as a display element, where the OLED may be connected to a pixel circuit. Each pixel PX may be configured to emit, for example, red, green, blue, or white light from the OLED. In other embodiments, inorganic light-emitting display elements, or quantum-dot light-emitting display elements may be substituted for the OLEDs in the display apparatus 1.

A plurality of gate lines may be spaced from one another with a constant interval in a y direction (e.g., a column direction) in the pixel portion 110. The gate lines may each extend in an x direction (e.g., a row direction) and be connected to the pixels PX arranged in the same row (a row line).

A plurality of data lines may be spaced from one another with a constant interval in the x direction in the pixel portion 110. The data lines may each extend in the y direction and may be connected to the pixels PX arranged in the same column (a column line).

The gate driving circuit 130*a* may be connected to the gate lines and configured to sequentially apply gate signals to the gate lines. Any gate line may be connected to a gate of a transistor included in the pixel PX. A gate signal may be a gate control signal configured to control a turn-on and a turn-off of a transistor. A gate signal may be a square wave including an on-voltage by which a transistor may be turned on, and an off-voltage by which a transistor may be turned off. In an embodiment, an on-voltage may be a low-level voltage (a first level voltage) or a high-level voltage (a second level voltage). When a gate signal has an on-voltage, a transistor of a pixel PX connected to a relevant gate line may be turned on. Hereinafter, a period during which a gate signal maintains an on-voltage is referred to as an on-time.

The gate driving circuit 130*a* may include a first gate driving circuit 132*a*, a second gate driving circuit 134*a*, and a third gate driving circuit 136*a*. The gate lines may include first gate lines GWL, second gate lines GCL, third gate lines GIL, fourth gate lines GBL, and fifth gate lines EML. The first gate lines GWL are connected to the first gate driving circuit 132*a*; the second gate lines GCL, the third gate lines GIL, and the fourth gate lines GBL are connected to the second gate driving circuit 134*a*; and the fifth gate lines EML are connected to the third gate driving circuit 136*a*.

The first gate driving circuit 132*a* may be connected to a plurality of first gate lines GWL and configured to sequentially supply the first gate signals GW to the first gate lines GWL according to a first control signal GCS1. The second gate driving circuit 134*a* may be connected to the plurality of second gate lines GCL, the plurality of third gate lines GIL, and the plurality of fourth gate lines GBL. The second gate driving circuit 134*a* may be configured to sequentially supply second gate signals GC to the second gate lines GCL, sequentially supply third gate signals GI to the third gate lines GIL, and sequentially supply fourth gate signals GB to the fourth gate lines GBL according to a second control signal GCS2. The third gate driving circuit 136*a* may be connected to a plurality of fifth gate lines EML (emission control lines) and configured to sequentially supply the fifth gate signals EM (emission control signals) to the fifth gate lines EML according to a third control signal GCS3.

The data driving circuit 150 may be connected to a plurality of data lines DL and configured to apply a data signal DATA representing a grayscale to the data lines DL according to a fourth control signal DCS. The data driving circuit 150 may be configured to convert input image data into a data signal DATA of a voltage or current form, wherein the input image data has a grayscale and is input from the controller 190.

The power supply circuit 170 may be configured to generate voltages used for driving pixels PX according to a fifth control signal PCS. As an example, the power supply circuit 170 may be configured to generate a first driving voltage ELVDD and a second driving voltage ELVSS and supply the same to the pixels PX. The first driving voltage ELVDD may be a high-level voltage provided to a first electrode (a pixel electrode or an anode) of a display element included in a pixel PX. The second driving voltage ELVSS may be a low-level voltage provided to a second electrode (an opposite electrode or a cathode) of a display element included in a pixel PX. The power supply circuit 170 may be configured to generate a reference voltage Vref, a first initialization voltage Vinit and a second initialization voltage Vaint and supply the same to the pixels PX.

A voltage level of the first driving voltage ELVDD may be greater than a voltage level of the second driving voltage ELVSS. A voltage level of the reference voltage Vref may be less than a voltage level of the first driving voltage ELVDD. A voltage level of the first initialization voltage Vinit may be less than a voltage level of the second driving voltage ELVSS. A voltage level of the second initialization voltage Vaint may be greater than a voltage level of the first initialization voltage Vinit. A voltage level of the second initialization voltage Vaint may equal or exceed a voltage level of the second driving voltage ELVSS.

The controller 190 may be configured to control the pixel portion 110 by controlling an operation timing of the gate driving circuit 130*a* and the data driving circuit 150. The controller 190 may be configured to generate the first to fifth control signals GCS1, GCS2, GCS3, DCS, and PCS and respectively transfer the first to fifth control signals GCS1, GCS2, GCS3, DCS, and PCS to the first gate driving circuit 132*a*, the second gate driving circuit 134*a*, the third gate driving circuit 136*a*, the data driving circuit 150, and the power supply circuit 170.

The display apparatus 1 may include a display panel, and the display panel may include a substrate. The pixels PX may be arranged in a display area of the substrate. A portion or all of the gate driving circuit 130*a* may be directly formed in a peripheral area of the substrate during a process of forming a transistor configuring a pixel circuit in the display area of the substrate. The data driving circuit 150, the power supply circuit 170, and the controller 190 may be formed as separate integrated circuit chips, respectively, or one integrated circuit chip, and disposed on a flexible printed circuit board (FPCB) electrically connected to a pad arranged on one side of the substrate. In another embodiment, the data driving circuit 150, the power supply circuit 170, and the controller 190 may be directly disposed on the substrate using a chip-on-glass (COG) or chip-on-plastic (COP) method.

Figure 2:
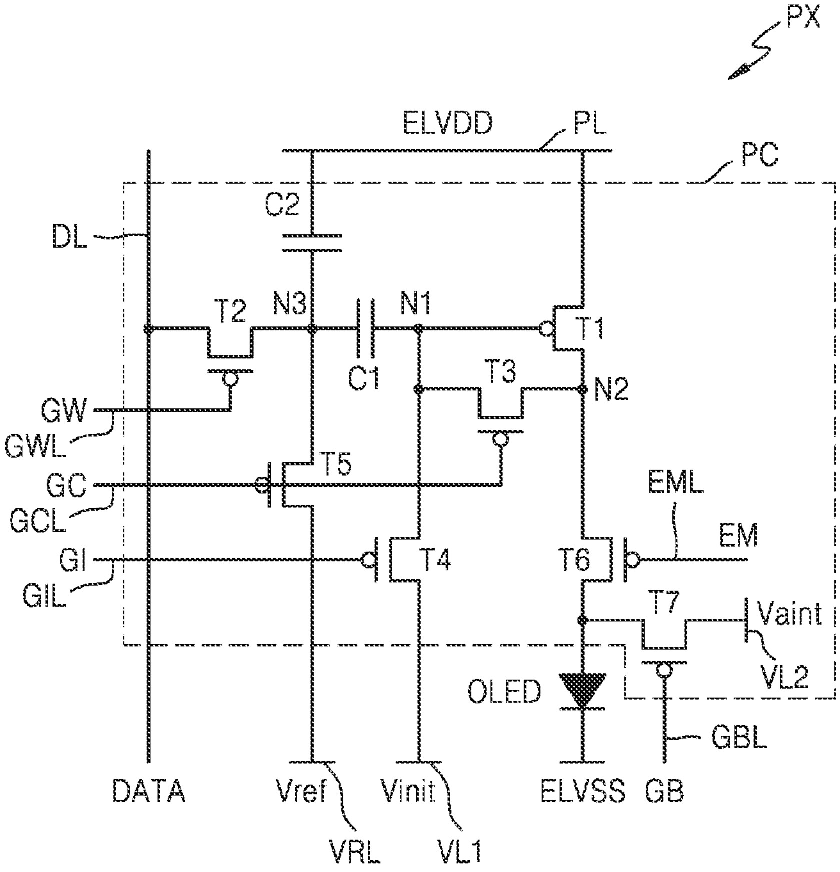
FIG. 2 is a schematic circuit diagram of a pixel according to an embodiment.
Figure 3:
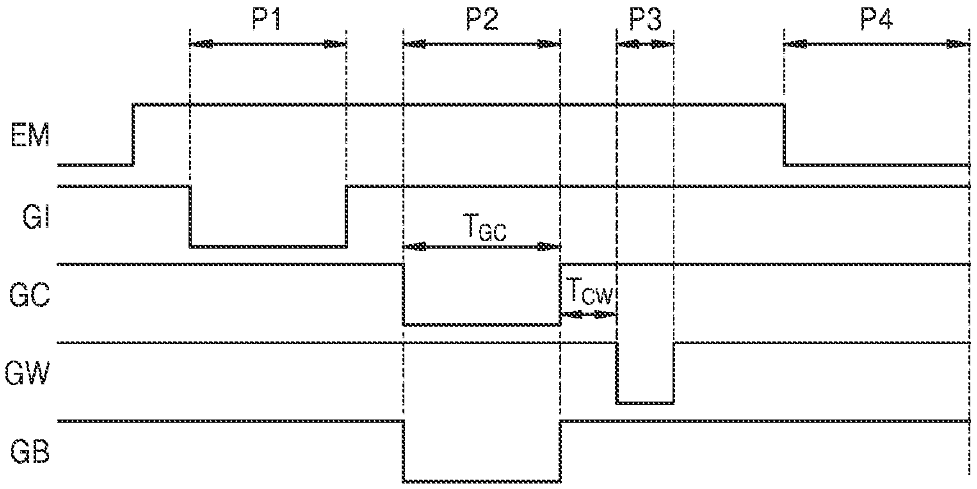
FIG. 3 is a waveform diagram of signals for explaining an operation of the pixel shown in FIG. 2.

FIG. 2 is a schematic circuit diagram of a pixel according to an embodiment. FIG. 3 is a waveform diagram of signals for explaining an operation of the pixel shown in FIG. 2.

Referring to FIG. 2, the pixel PX may include an organic light-emitting diode OLED as a display element, and a pixel circuit PC connected to the OLED. The pixel circuit PC may include first to seventh transistors T1, T2, T3, T4, T5, T6, and T7, and first and second capacitors C1 and C2. The first transistor T1 may be a driving transistor configured to output a driving current corresponding to a data signal, and the second to seventh transistors T2, T3, T4, T5, T6, and T7 may be switching transistors configured to transfer signals. In the following discussion, a first terminal (a first electrode) of each of the first to seventh transistors T1, T2, T3, T4, T5, T6, and T7 may be a source or a drain, and a second terminal (a second electrode) may be a drain or source different from the first terminal. As an example, in the case where the first terminal is a source, the second terminal may be a drain, and vice versa. A node to which a gate of the first transistor T1 is connected may be defined as a first node N1, a node to which a second terminal of the first transistor T1 is connected may be defined as a second node N2, and a node to which the first capacitor C1 and the second capacitor C2 are connected may be defined as a third node N3.

A pixel PX may be connected to the first gate line GWL configured to transfer a first gate signal GW, the second gate line GCL configured to transfer a second gate signal GC, a third gate line GIL configured to transfer a third gate signal GI, a fourth gate line GBL configured to transfer a fourth gate signal GB, the emission control line EML configured to transfer an emission control signal EM, and the data line DL configured to transfer a data signal DATA. In addition, the pixel PX may be connected to a driving voltage line PL configured to transfer the first driving voltage ELVDD, a first initialization voltage line VL1 configured to transfer the first initialization voltage Vinit, a second initialization voltage line VL2 configured to transfer a second initialization voltage Vaint, and a reference voltage line VRL configured to transfer the reference voltage Vref.

The first transistor T1 may be connected between the driving voltage line PL and the second node N2. The first transistor T1 may include a gate, a first terminal, and a second terminal, wherein the gate is connected to the first node N1, the first terminal is connected to the driving voltage line PL, and the second terminal is connected to the second node N2. The second terminal of first transistor T1 may be connected to the OLED through the sixth transistor T6. The first transistor T1 may receive a data signal DATA according to a switching operation of the second transistor T2, and may be configured to control the amount of driving current flowing through the OLED.

The second transistor T2 may be connected between the data line DL and the third node N3. T2 may include a gate, a first terminal, and a second terminal, where the gate is connected to GWL, the first terminal is connected to DL, and the second terminal is connected to N3. T2 may be turned on according to a first gate signal GW transferred through GWL to electrically connect DL to N3 and may transfer DATA to N3, where DATA is transferred through DL.

T3 may be connected between N1 and N2. T3 may include a gate, a first terminal, and a second terminal, where the gate is connected to GCL, the first terminal is connected to the second terminal of T1, and the second terminal is connected to N1. T3 may be turned on according to a second gate signal GC to diode-connect T1, where GC is transferred through GCL.

T4 may be connected between N1 and VL1. T4 includes a gate, a first terminal, and a second terminal, where the gate is connected to GIL, the first terminal is connected to N1, and the second terminal is connected to VL1. T4 may be turned on according to a third gate signal GI transferred through GIL to initialize the gate of T1 to Vinit.

T5 may be connected between VRL and N3. T5 may include a gate, a first terminal, and a second terminal, where the gate is connected to GCL, the first terminal is connected to VRL, and the second terminal is connected to N3. T5 may be turned on according to a second gate signal GC to transfer Vref to N3, where GC is transferred through GCL.

T6 may be connected between N2 and the OLED. T6 may include a gate, a first terminal, and a second terminal, where the gate is connected to EML, the first terminal is connected to N2, and the second terminal is connected to a pixel electrode of the OLED. T6 may be turned on or turned off according to a fifth gate signal EM to control electrical connection between T1 and the OLED, where EM is transferred through EML.

T7 may be connected between the OLED and VL2. T7 may include a gate, a first terminal, and a second terminal, where the gate is connected to GBL, the first terminal is connected to T6 and the OLED, and the second terminal is connected to VL2. T7 may be turned on according to a fourth gate signal GB transferred through GBL to initialize the pixel electrode of the OLED to Vaint.

The first capacitor C1 may be connected between a first node N1 and a third node N3. A first electrode of the first capacitor C1 may be connected to the first node N1, and a second electrode of the first capacitor C1 may be connected to the third node N3. The first capacitor C1 may be configured to control the voltage of the first node N1 in response to the amount of change in the voltage of the third node N3. Accordingly, the first capacitor C1 may be configured to transfer a data signal DATA to the gate of the first transistor T1.

The second capacitor C2 may be connected between the driving voltage line PL and the third node N3. A first electrode of the second capacitor C2 may be connected to the driving voltage line PL, and a second electrode of the second capacitor C2 may be connected to the third node N3. The voltage of the third node N3 may be maintained constant by the second capacitor C2.

The OLED may include the pixel electrode (the anode) and the opposite electrode (the cathode), wherein the pixel electrode is connected to the second terminal of the sixth transistor T6, and the opposite electrode faces the pixel electrode and is configured to receive the second driving voltage ELVSS. The opposite electrode may be a common electrode, which is common for the plurality of pixels PX.

Referring to FIG. 3, a first period P1 may be a first initialization period in which the gate of the first transistor T1 is initialized. During the first period P1, a third gate signal GI of an on-voltage may be supplied through the third gate line GIL, the fourth transistor T4 may be turned on, and the first node N1, that is, the gate of the first transistor T1 may be initialized to the first initialization voltage Vinit.

A second period P2 may be a compensation period in which a threshold voltage of the first transistor T1 is compensated.

Threshold voltage compensation circuitry may be incorporated into the pixel circuitry. The compensation circuitry may include at least one switching transistor and a capacitor. The capacitor may store a voltage to effectively counteract the threshold voltage of an output driving transistor coupled to the pixel emission element, allowing for a faster turn-on in response to gate driving signals. In other examples, the compensation circuitry compensates for variations in threshold voltages among the driving transistors within different pixels, thereby improving image quality of the display. Herein, when a threshold voltage of a transistor is said to be compensated, this signifies that threshold voltage compensation circuitry may supply voltage/current to the transistor to change an overall circuit action or inaction that results from an uncompensated threshold voltage for that transistor.

During the second period P2, a second gate signal GC of an on-voltage may be supplied through the second gate line GCL, and thus, the third transistor T3 and the fifth transistor T5 may be turned on. The reference voltage Vref may be applied to the second electrode of the first capacitor C1 by the fifth transistor T5. The first transistor T1 may be diode-connected by the third transistor T3, a voltage corresponding to the threshold voltage of the first transistor T1 may be stored in the first capacitor C1, and the threshold voltage of the first transistor T1 may be compensated. The voltage stored in the first capacitor C1 during the second period P2 may subsequently cause the first transistor T1 to react to a gate control signal as though it were a transistor having a lower threshold voltage (in absolute value), thereby switching with a faster effective reaction time. In other examples, the voltage stored in the first capacitor C1 during the period P2 compensates for variations in threshold voltages among the first transistors T1 within different respective pixels PX, thereby improving image quality of the display.

In an embodiment, the second period P2 may be a second initialization period in which the OLED is initialized. That is, during the second period P2, a second gate signal GC of an on-voltage may overlap a fourth gate signal GB of an on-voltage. During the second period P2, a fourth gate signal GB of an on-voltage may be supplied through the fourth gate line GBL, the seventh transistor T7 may be turned on, and the pixel electrode of the OLED may be initialized to the second initialization voltage Vaint.

A third period P3 may be a write-period in which a data signal is applied to a pixel PX. During the third period P3, a first gate signal GW of an on-voltage may be supplied through the first gate line GWL, and the second transistor T2 may be turned on. The second transistor T2 may be configured to transfer a data signal DATA from the data line DL to the third node N3. The first capacitor C1 may be configured to apply the voltage of a data signal DATA to the first node N1 to which the gate of the first transistor T1 is connected in response to the amount of change in the voltage of the third node N3.

During the first to third periods P1, P2, and P3, because a fifth gate signal EM of an off-voltage is applied through the fifth gate line EML and the sixth transistor T6 is turned off, electrical connection between the first transistor T1 and the OLED may be blocked.

A fourth period P4 may be a light-emission period in which the OLED is configured to emit light. During the fourth period P4, a fifth gate signal EM of an on-voltage may be applied through the fifth gate line EML, the sixth transistor T6 may be turned on, the first transistor T1 is configured to output a driving current corresponding to a data signal DATA stored in the first capacitor C1, and the OLED may be configured to emit light at brightness corresponding to the magnitude of the driving current.

In the case where a first gate signal GW and a second gate signal GC are output by one gate driving circuit, an on-time of each of the first gate signal GW and the second gate signal GC and an interval between the first gate signal GW and the second gate signal GC are fixed.

In an embodiment, as shown in FIGS. 1 and 2, because the first gate driving circuit 132*a* configured to output a first gate signal GW and the second gate driving circuit 134*a* configured to output a second gate signal GC are separately provided, an on-time $T_{GC}$ of the second gate signal GC and an interval $T_{CW}$ (hereinafter, referred to as a 'signal interval') between the second gate signal GC and the first gate signal GW may be adjusted. The second period P2, which is the compensation period of the first transistor T1, may be sufficiently set to a desired length of time by adjusting the on-time $T_{GC}$ of the second gate signal GC.

Figure 4A:
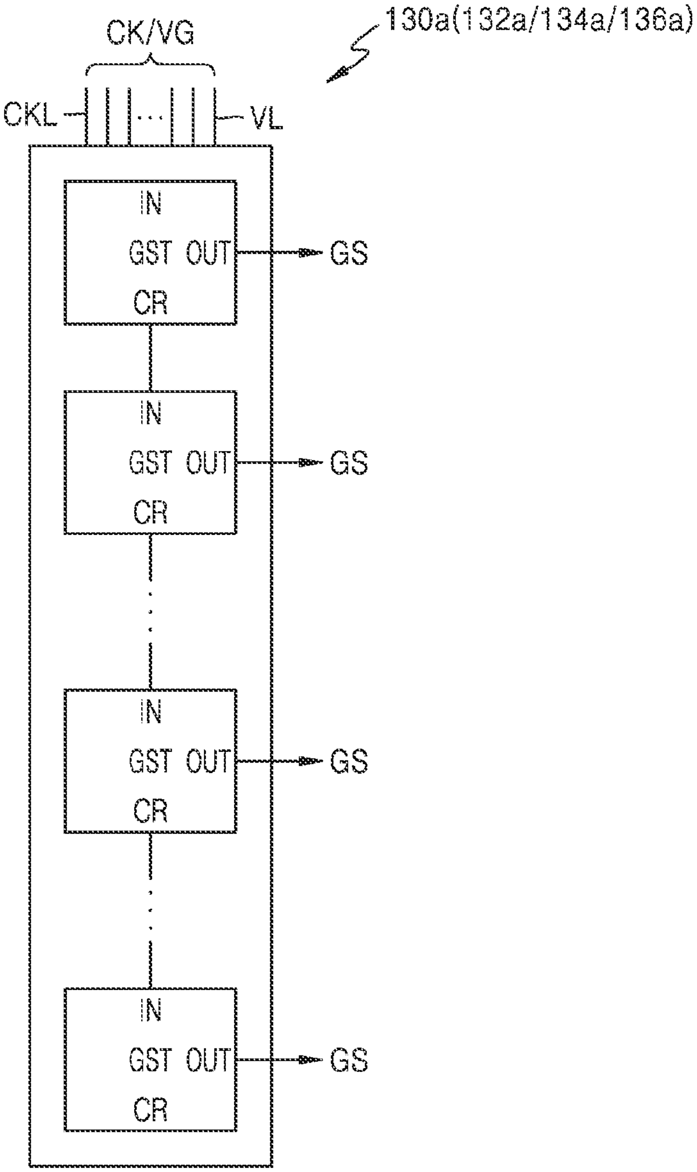
FIG. 4A is a schematic view of a gate driving circuit according to an embodiment.
Figure 4B:
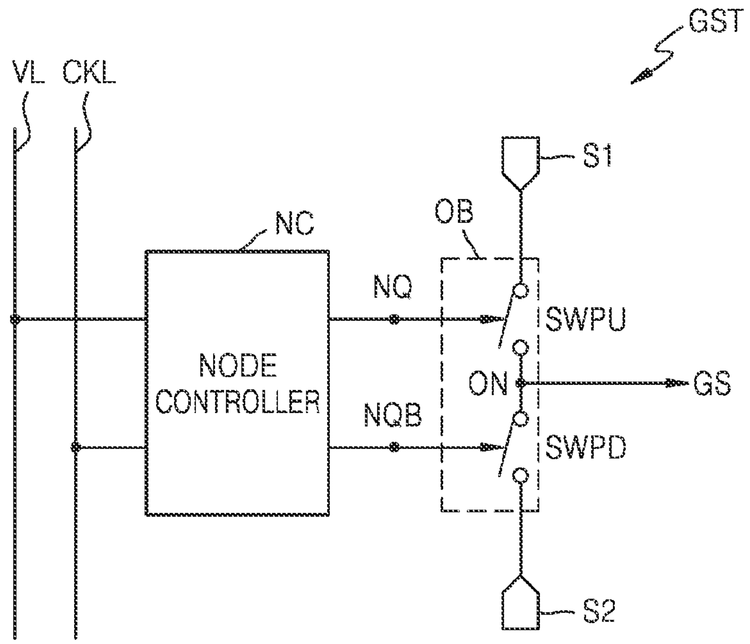
FIG. 4B is a schematic view of an arbitrary stage configuring a gate driving circuit according to an embodiment.

FIG. 4A is a schematic view of the gate driving circuit 130*a* according to an embodiment. FIG. 4B is a schematic view of an arbitrary stage configuring the gate driving circuit 130*a* according to an embodiment.

The gate driving circuit 130*a* may include a plurality of stages GST, and each stage GST may be configured to receive at least one clock signal CK and at least one voltage signal VG and generate at least one gate signal GS. The stage GST may be configured to receive at least one clock signal CK from at least one clock line CKL and receive at least one voltage signal VG from at least one voltage line VL. The stage GST may be configured to output at least one gate signal GS to at least one gate line connected thereto. As an example, each stage GST of the first gate driving circuit 132*a* may be configured to output a first gate signal GW to the first gate line GWL. Each stage GST of the second gate driving circuit 134*a* may be configured to output a second gate signal GC to the second gate line GCL, output a third gate signal GI to the third gate line GIL, and output a fourth gate signal GB to the fourth gate line GBL. Each stage GST of the third gate driving circuit 136*a* may be configured to output a fifth gate signal EM to the fifth gate line EML. Each stage GST may be configured to receive a start signal through an input terminal IN and output at least one gate signal GS through a output terminal OUT and a carry signal through a carry terminal CR.

As shown in FIG. 4B, the stage GST may include a node controller NC and an output unit OB, wherein the node controller NC is configured to control voltage levels of a first control node NQ and a second control node NQB, and the output unit OB includes a pull-up transistor SWPU and a pull-down transistor SWPD.

The pull-up transistor SWPU may be turned on and off according to a voltage level of the first control node NQ, connected between a terminal S1 and an output node ON. SWPU may output a signal of a first voltage level applied to the terminal S1 as a gate signal GS. The pull-down transistor SWPD may be turned on or turned off according to a voltage level of the second control node NQB, connected between a terminal S2 and the output node ON, and may output a signal of a second voltage level applied to the terminal S2 as a gate signal GS. In an embodiment, the first voltage level may be a high voltage level, and the second voltage level may be a low voltage level.

The stage GST may include the number of output units OB corresponding to the number of gate signals output by the stage GST. As an example, each stage GST of the first gate driving circuit 132*a* may include an output unit including a pull-up transistor and a pull-down transistor, wherein the pull-up transistor is configured to output a first gate signal GW of a first voltage level, and the pull-down transistor is configured to output a first gate signal GW of a second voltage level. Each stage GST of the second gate driving circuit 134*a* may include a first output unit, a second output unit, and a third output unit. The first output unit includes a pull-up transistor and a pull-down transistor, wherein the pull-up transistor is configured to output a second gate signal GC of a first voltage level, and the pull-down transistor is configured to output a second gate signal GC of a second voltage level. The second output unit includes a pull-up transistor and a pull-down transistor, wherein the pull-up transistor is configured to output a third gate signal GI of a first voltage level, and the pull-down transistor is configured to output a third gate signal GI of a second voltage level. The third output unit includes a pull-up transistor and a pull-down transistor, wherein the pull-up transistor is configured to output a fourth gate signal GB of a first voltage level, and the pull-down transistor is configured to output a fourth gate signal GB of a second voltage level. Each stage GST of the third gate driving circuit 136*a* may include an output unit including a pull-up transistor and a pull-down transistor, wherein the pull-up transistor is configured to output a fifth gate signal EM of a first voltage level, and the pull-down transistor is configured to output a fifth gate signal EM of a second voltage level.

Figure 5A:
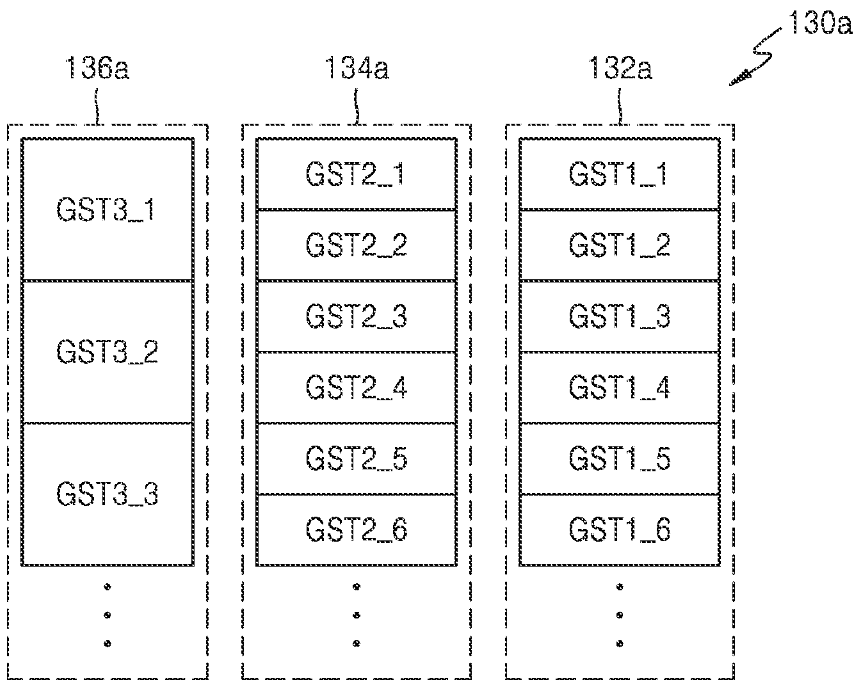
FIGS. 5A, 5B and 5C are views for explaining a gate driving circuit according to an embodiment.
Figure 5B:
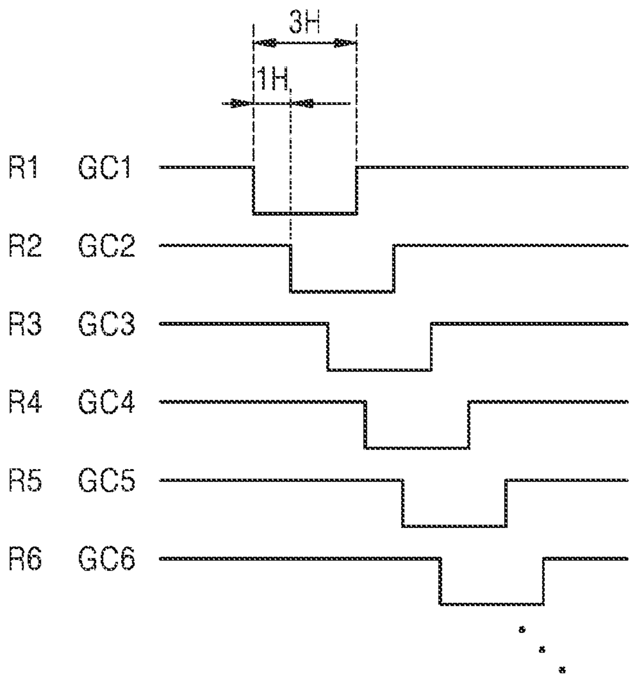
Figure 5C:
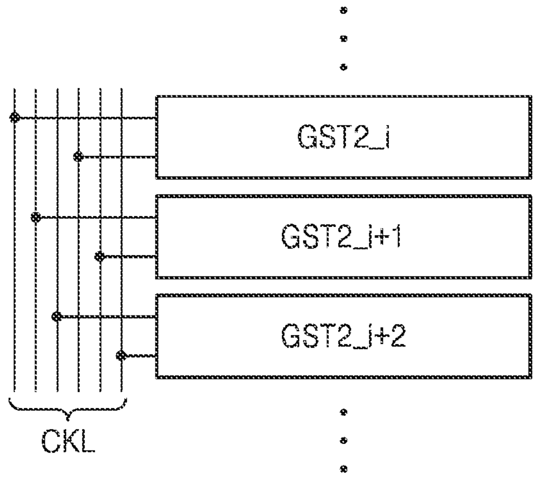

FIGS. 5A to 5C are views for explaining the gate driving circuit 130*a* according to an embodiment.

As shown in FIG. 5A, the gate driving circuit 130*a* may include the first gate driving circuit 132*a*, the second gate driving circuit 134*a*, and the third gate driving circuit 136*a*.

The first gate driving circuit 132*a* may include a plurality of first stages GST1_1, GST1_2, GST1_3, . . . , and each of GST1_1, GST1_2, GST1_3, . . . may correspond to a respective row of the pixel portion 110 (see FIG. 1). Each of the plurality of first stages GST1_1, GST1_2, GST1_3, . . . may be configured to generate a first gate signal GW and output the same to the first gate line GWL in a corresponding row.

The second gate driving circuit 134*a* may include a plurality of second stages GST2_1, GST2_2, GST2_3, . . . , and each of GST2_1, GST2_2, GST2_3, . . . may correspond to each row of the pixel portion 110. Each of the plurality of second stages GST2_1, GST2_2, GST2_3, . . . may be configured to generate a second gate signal GC, a third gate signal GI, and a fourth gate signal GB and respectively output the same to the second gate line GCL, the third gate line GIL, and the fourth gate line GBL.

The third gate driving circuit 136*a* may include a plurality of third stages GST3_1, GST3_2, GST3_3, . . . , and each of GST3_1, GST3_2, GST3_3, . . . may correspond to two or more rows of the pixel portion 110. As an example, each of the plurality of third stages GST3_1, GST3_2, GST3_3, . . . may correspond to two rows (a pair of rows) of the pixel portion 110. Each of the plurality of third stages GST3_1, GST3_2, GST3_3, . . . may be configured to generate a fifth gate signal EM and output the same to the fifth gate line EML in corresponding two or more rows. As an example, the fifth gate signal EM may be simultaneously supplied to the fifth gate lines EML arranged in two rows.

The plurality of second stages GST2_1, GST2_2, GST2_3, . . . of the second gate driving circuit 134*a* may be configured to sequentially output second gate signals GC1, GC2, GC3, . . . to the second gate lines GCL in corresponding rows R1, R2, R3, . . . . The second gate signals GC1, GC2, GC3, . . . may be shifted at a preset interval and output at on-times. As an example, as shown in FIG. 5B, second gate signals GC1, GC2, GC3, . . . output by the second stages GST2_1, GST2_2, GST2_3, . . . may be shifted at a 1 horizontal period (1H) and sequentially output. Here, 1H may be 1/(a driving frequency×vertical resolution).

To sufficiently secure the compensation period (e.g., the second period P2 of FIG. 3) of a pixel to a desired time duration while a display apparatus is driven at a high-speed, an on-time of a second gate signal GC may need to be increased. In the case where a stage configured to output a second gate signal GC is arranged on a row basis, as an on-time of the second gate signal GC increases, the number of clock signals input to the second gate driving circuit 134*a* may increase. As an example, for a second gate signal GC to be output at an on-time of a 1 horizontal period 1H, two clock signals input to the second gate driving circuit 134*a* may be used. For a second gate signal GC to be output at an on-time of 2 horizontal periods 2H, four clock signals input to the second gate driving circuit 134*a* may be used. As shown in FIG. 5B, for second gate signals GC1, GC2, GC3, . . . to be output at an on-time of 3H, six clock signals may be used. Accordingly, as shown in FIG. 5C, the second gate driving circuit 134*a* may be connected to six clock lines CKL, each of the second stages GST2_1, GST2_2, GST2_3, . . . may be connected to two clock lines CKL among six clock lines CKL, and connection of the six clock lines CKL may be alternately repeated on a basis of three second stages GST2_*i*, GST2_*i*+1, and GST2_*i*+2.

Figure 6A:
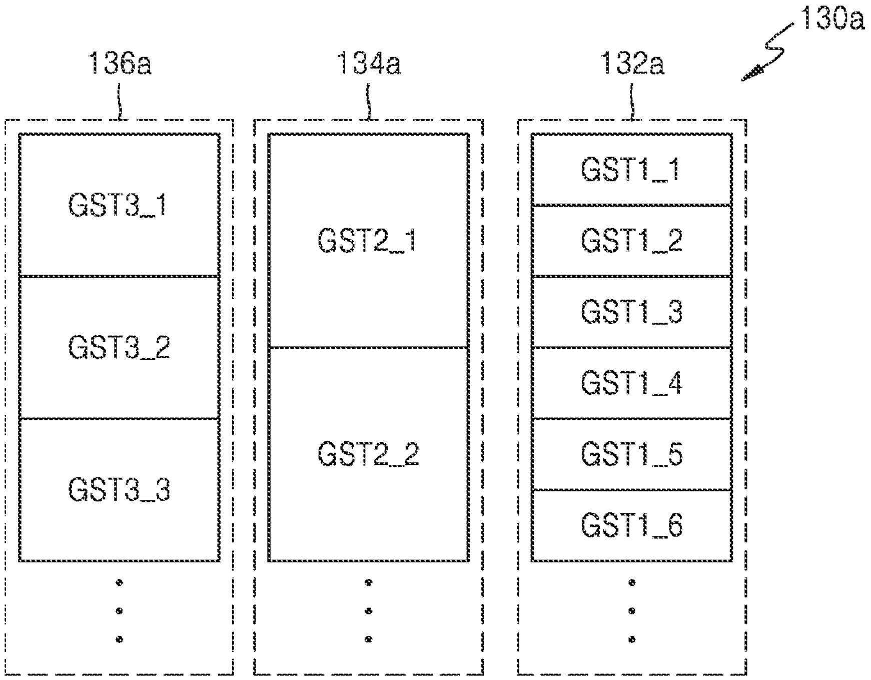
FIGS. 6A, 6B and 6C are views for explaining a gate driving circuit according to an embodiment.
Figure 6B:
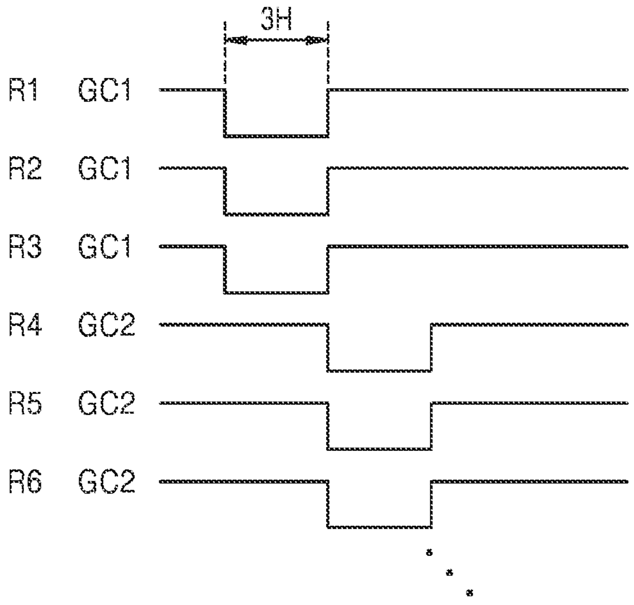
Figure 6C:
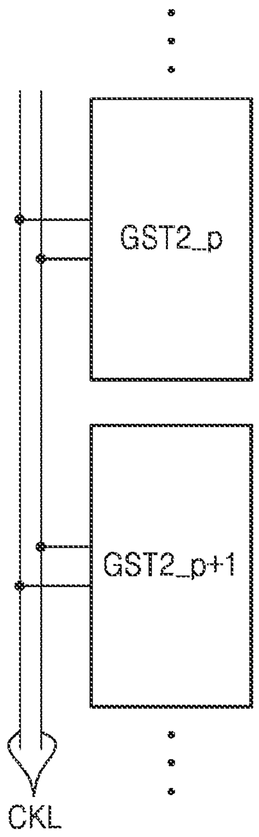

FIGS. 6A to 6C are views for explaining the gate driving circuit 130*a* according to an embodiment. The gate driving circuit 130*a* shown in FIG. 6A is different from the gate driving circuit 130*a* shown in FIG. 5A. Each of the second stages of the second gate driving circuit 134*a* in FIG. 6A corresponds to three rows, instead of to one row as in FIG. 5A. Hereinafter, redundant description of the same configuration is omitted, and differences are mainly described.

As shown in FIG. 6A, the second gate driving circuit 134*a* may include a plurality of second stages GST2_1, GST2_2, . . . , and each of the plurality of second stages GST2_1, GST2_2, . . . may correspond to two or more rows of the pixel portion 110. As an example, each of the plurality of second stages GST2_1, GST2_2, . . . may correspond to three rows. Each of the plurality of second stages GST2_1, GST2_2, . . . may be configured to generate a second gate signal GC, a third gate signal GI, and a fourth gate signal GB and output the same to the second gate line GCL, the third gate line GIL, and the fourth gate line GBL of each of the three rows corresponding thereto. As an example, a second gate signal GC may be simultaneously supplied to the second gate lines GCL arranged in three rows, a third gate signal GI may be simultaneously supplied to the third gate lines GIL arranged in three rows, and a fourth gate signal GB may be simultaneously supplied to the fourth gate lines GBL arranged in three rows. Hereinafter, for convenience of description, an embodiment in which each of the plurality of second stages GST2_1, GST2_2, . . . are provided to correspond to three rows is mainly described.

As shown in FIG. 6B, the first second stage GST2_1 of the second gate driving circuit 134*a* may be configured to simultaneously supply a first second gate signal GC1 to the second gate lines GCL of each of the first to third rows R1, R2, and R3 corresponding thereto. The second second stage GST2_2 of the second gate driving circuit 134*a* may be configured to simultaneously supply a second second gate signal GC2 to the second gate lines GCL of each of the fourth to sixth rows R4, R5, and R6 corresponding thereto. The second gate signals GC1, GC2, . . . may have an on-time of 3H, which is shifted by 3H between GC1 and GC2, and output.

Each of the second stages shown in FIG. 6A may be implemented as one second stage in which three second stages shown in FIG. 5A are integrated, and second gate lines in three rows may share a second gate signal. As shown in FIG. 6C, a p-th second stage GST2_*p* may be implemented as one stage in which three second stages GST2_*i*, GST2_*i*+1, and GST2_*i*+2 shown in FIG. 5C are integrated. Accordingly, two clock signals are sufficient for each of the second stages GST2_1, GST2_2, . . . of the second gate driving circuit 134*a* to generate second gate signals GC1, GC2, . . . having an on-time of 3H. Therefore, each of the second stages GST2_1, GST2_2, . . . of the second gate driving circuit 134*a* may be connected to two clock lines CKL. FIG. 6C shows an example in which the p-th second stage GST2_*p* is connected to two clock lines CKL.

The second gate driving circuit 134*a* according to an embodiment of FIGS. 6A to 6C may be configured to sufficiently secure an on-time of a second gate signal GC using a smaller number of clock signals and improve power consumption compared to the second gate driving circuit 134*a* shown in FIGS. 5A to 5C.

An area of a region in which the second gate driving circuit 134*a* and the clock lines CKL according to an embodiment of FIGS. 6A to 6C are arranged may be reduced compared to an area of a region in which the second gate driving circuit 134*a* and the clock lines CKL shown in FIGS. 5A to 5C are arranged. Accordingly, because the area of the region in which the second gate driving circuit 134*a* according to an embodiment of FIGS. 6A to 6C are arranged is reduced compared to an area of a region in which the second gate driving circuit 134*a* shown in FIGS. 5A to 5C are arranged, a "dead space" of the display apparatus may be reduced and/or the display apparatus 1 may have reduced circuit complexity yet achieve substantially the same image display quality (discussed further below).

Figure 7:
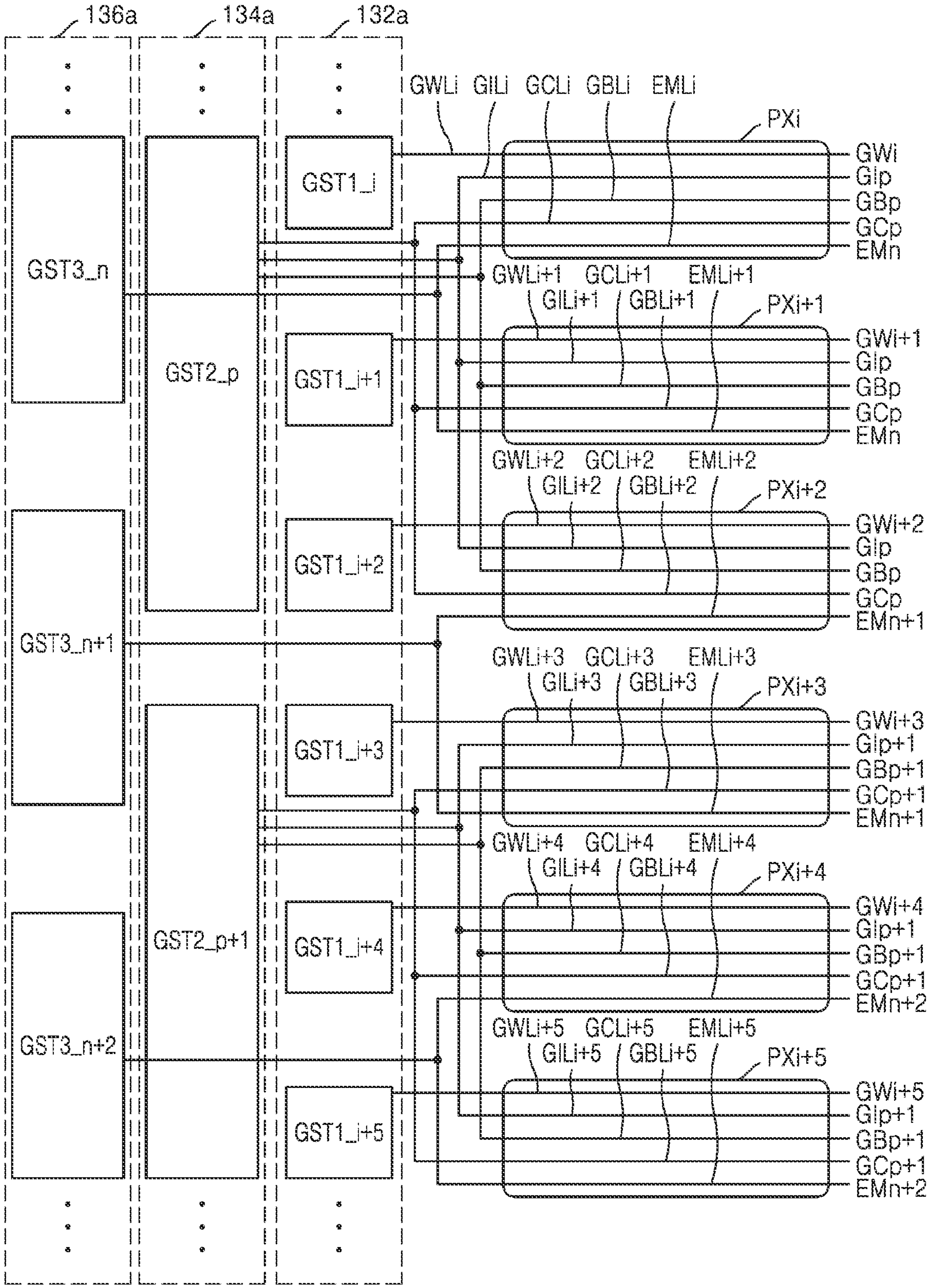
FIG. 7 is a view for explaining gate lines connected to a gate driving circuit and a pixel according to an embodiment.
Figure 8:
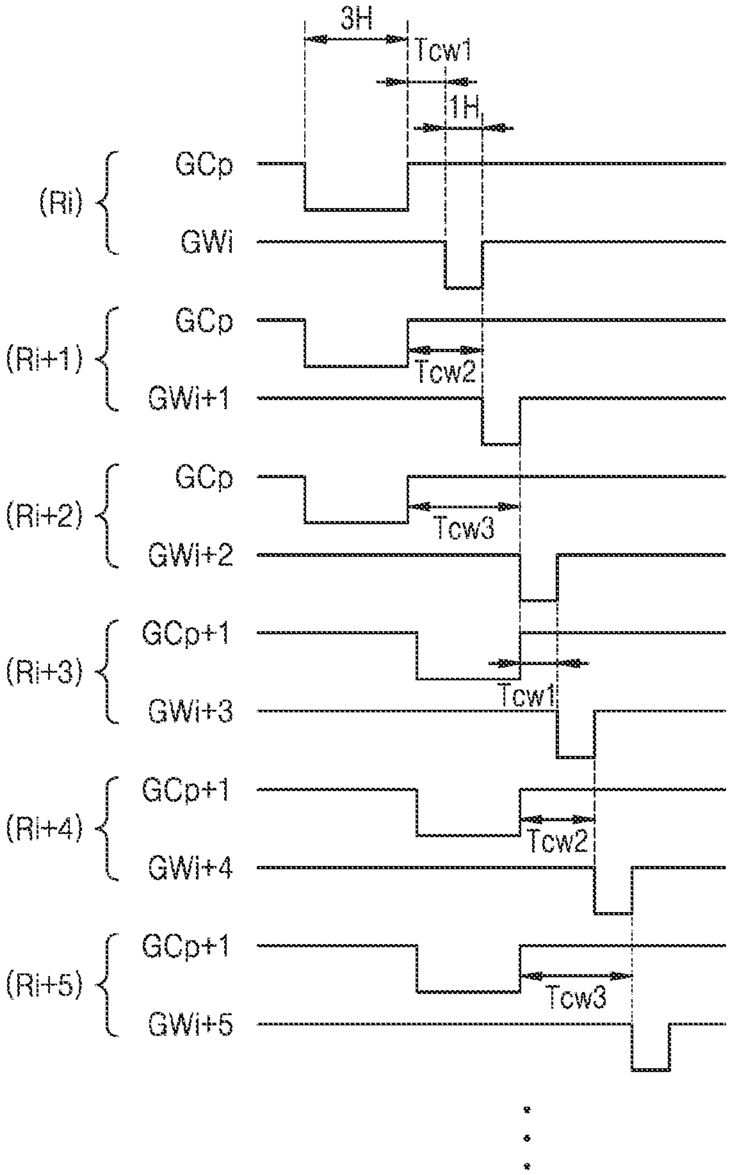
FIG. 8 is a view for explaining gate signals output by the gate driving circuit of FIG. 7.

FIG. 7 is a view for explaining the gate lines connected to the gate driving circuit and the pixel according to an embodiment. FIG. 8 is a view for explaining gate signals output by the gate driving circuit of FIG. 7.

In an embodiment, as shown in FIG. 7, the first gate driving circuit 132*a* may include a plurality of first stages . . . , GST1_*i*, GST1_*i*+1, GST1_*i*+2, GST1_*i*+3, GST1_*i*+4, GST1_*i*+5, . . . in a row unit.

An i-th first stage GST1_*i* arranged to correspond to an i-th row (a horizontal line) may be configured to supply an i-th first gate signal GWi to an i-th first gate line GWLi connected to an i-th pixel PXi arranged in the i-th row. The remaining stages GST1 as shown in FIG. 7 may have the same connection and signal communication relationships to pixels PX in a corresponding row. To this end, "1+1", "i+2" . . . "i+5" may each be substituted for "i" in the preceding discussion involving GST1_*i* to describe the respective connection relationships between the stages GST1, signals GW, gate lines GWL, and pixels PX.

An i-th pixel PXi to an (i+5)-th pixel PXi+5 shown in FIG. 7 are pixels arranged in the same column and may have substantially the same pixel structure.

In an embodiment, as shown in FIG. 7, the second gate driving circuit 134*a* may include a plurality of second stages . . . , GST2_*p*, GST2_*p*+1, . . . in units of three rows.

A p-th second stage GST2_*p* may be arranged to correspond to an i-th row, an (i+1)-th row, and an (i+2)-th row. A p-th second stage GST2_*p* may be configured to supply a p-th second gate signal GCp to an i-th second gate line GCLi connected to an i-th pixel PXi, an (i+1)-th second gate line GCLi+1 connected to an (i+1)-th pixel PXi+1, and an (i+2)-th second gate line GCLi+2 connected to an (i+2)-th pixel PXi+2. The p-th second stage GST2_*p* may be configured to supply a p-th third gate signal GIp to an i-th third gate line GILi connected to an i-th pixel PXi, an (i+1)-th third gate line GILi+1 connected to an (i+1)-th pixel PXi+1, and an (i+2)-th third gate line GILi+2 connected to an (i+2)-th pixel PXi+2. The p-th second stage GST2_*p* may be configured to supply a p-th fourth gate signal GBp to an i-th fourth gate line GBLi connected to an i-th pixel PXi, an (i+1)-th fourth gate line GBLi+1 connected to an (i+1)-th pixel PXi+1, and an (i+2)-th fourth gate line GBLi+2 connected to an (i+2)-th pixel PXi+2. The same type of connection and signal communication relationship may exist between the second stage GST2_*p*+1 and three pixels (PXi+3, PXi+4 and PXi+5) and the gate lines GIL, GBL and GCL connected thereto.

In an embodiment, as shown in FIG. 7, the third gate driving circuit 136*a* may include a plurality of third stages . . . , GST3_*n*, GST3_*n*+1, GST3_*n*+2 . . . in units of two rows.

An n-th third stage GST3_*n* may be arranged to correspond to an i-th row and an (i+1)-th row. The n-the third stage GST3_*n* may be configured to supply an n-th fifth gate signal EMn to an i-th fifth gate line EMLi connected to an i-th pixel PXi and an (i+1)-th fifth gate line EMLi+1 connected to an (i+1)-th pixel PXi+1.

An (n+1)-th third stage GST3_*n*+1 may be arranged to correspond to an (i+2)-th row and an (i+3)-th row. An (n+1)-th third stage GST3_*n*+1 may be configured to supply an (n+1)-th fifth gate signal EMn+1 to an (i+2)-th fifth gate line EMLi+2 connected to an (i+2)-th pixel PXi+2 and an (i+3)-th fifth gate line EMLi+3 connected to an (i+3)-th pixel PXi+3.

An (n+2)-th third stage GST3_*n*+2 may be arranged to correspond to an (i+4)-th row and an (i+5)-th row. The (n+2)-th third stage GST3_*n*+2 may be configured to supply an (n+2)-th fifth gate signal EMn+2 to an (i+4)-th fifth gate line EMLi+4 connected to an (i+4)-th pixel PXi+4 and an (i+5)-th fifth gate line EMLi+5 connected to an (i+5)-th pixel PXi+5.

Referring to FIG. 8, in the second period P2 (see FIG. 3), a p-th second gate signal GCp having an on-time $T_{GC}$ of 3H may be simultaneously supplied from a p-th second stage GST2_*p* to an i-the second gate line GCLi in an i-th row Ri, an (i+1)-th second gate line GCLi+1 in an (i+1)-th row Ri+1, and an (i+2)-th second gate line GCLi+2 in an (i+2)-th row Ri+2.

A (p+1)-th second gate signal GCp+1 having an on-time $T_{GC}$ of 3H may be simultaneously supplied from the (p+1)-th second stage GST2_*p*+1 to an (i+3)-th second gate line GCLi+3 in an (i+3)-th row Ri+3, an (i+4)-th second gate line GCLi+4 in an (i+4)-th row Ri+4, and an (i+5)-th second gate line GCLi+5 in an (i+5)-th row Ri+5.

In the third period P3 (see FIG. 3), an i-th first gate signal GWi that is subsequent by a first signal interval $T_{CW1}$ of 1H from a p-th second gate signal GCp may be supplied from an i-th first stage GST1_*i* to an i-the first gate line GWLi in an i-th row Ri.

An (i+1)-th first gate signal GWi+1 that is subsequent by a second signal interval $T_{CW2}$ of 2H from a p-th second gate signal GCp may be supplied from an (i+1)-th first stage GST1_*i*+1 to an (i+1)-th first gate line GWLi+1 in an (i+1)-th row Ri+1.

An (i+2)-th first gate signal GWi+2 that is subsequent by a third signal interval $T_{CW3}$ of 3H from a p-th second gate signal GCp may be supplied from an (i+2)-th first stage GST1_*i*+2 to an (i+2)-th first gate line GWLi+2 in an (i+2)-th row Ri+2.

An (i+3)-th first gate signal GWi+3 that is subsequent by a first signal interval $T_{CW1}$ of 1H from a (p+1)-th second gate signal GCp+1 may be supplied from an (i+3)-th first stage GST1_*i*+3 to an (i+3)-th first gate line GWLi+3 in an (i+3)-th row Ri+3.

An (i+4)-th first gate signal GWi+4 that is subsequent by a second signal interval $T_{CW2}$ of 2H from a (p+1)-th second gate signal GCp+1 may be supplied from an (i+4)-th first stage GST1_*i*+4 to an (i+4)-th first gate line GWLi+4 in an (i+4)-th row Ri+4.

An (i+5)-th first gate signal GWi+5 that is subsequent by a third signal interval $T_{CW3}$ of 3H from a (p+1)-th second gate signal GCp+1 may be supplied from an (i+5)-th first stage GST1_*i*+5 to an (i+5)-th first gate line GWLi+5 in an (i+5)-th row Ri+5.

For a signal interval between a second gate signal GC and a first gate signal GW, a first signal interval $T_{CW1}$ of 1H, a second signal interval $T_{CW2}$ of 2H, and a third signal interval $T_{CW3}$ of 3H may be repeated in units of three rows.

Figure 9:
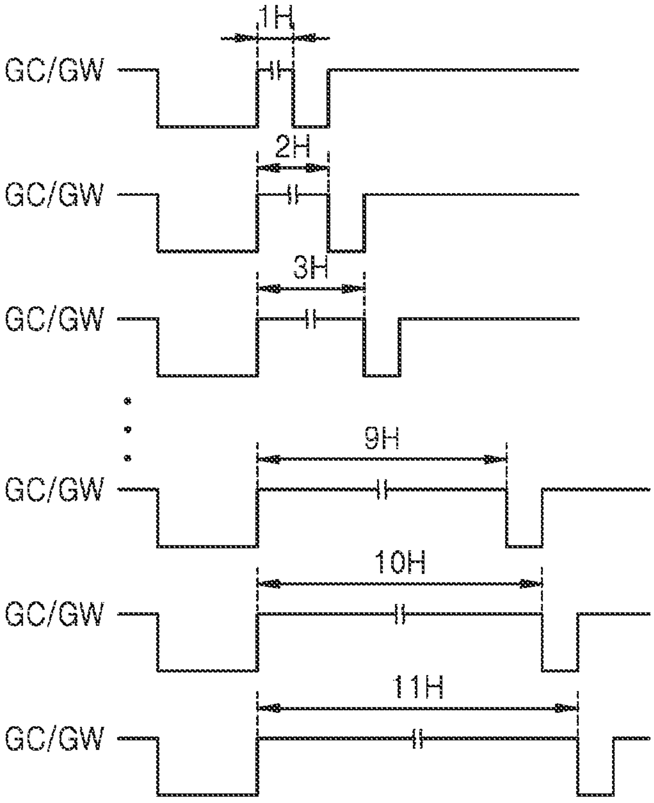
FIGS. 9 and 10 are views for explaining a brightness difference according to a signal interval between a second gate signal and a first gate signal according to an embodiment.
Figure 10:
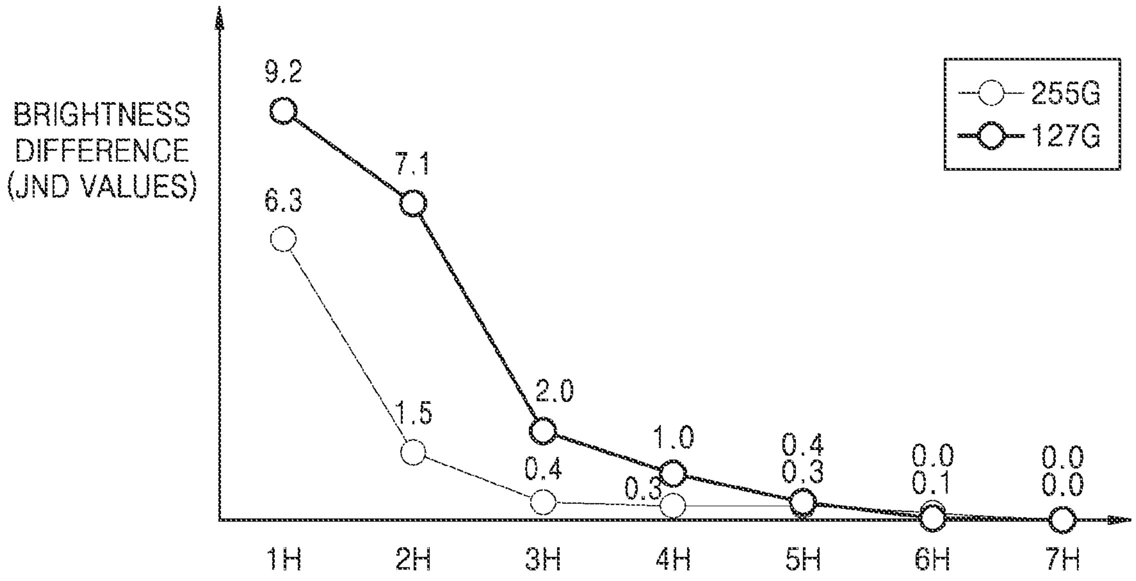
Figure 11:
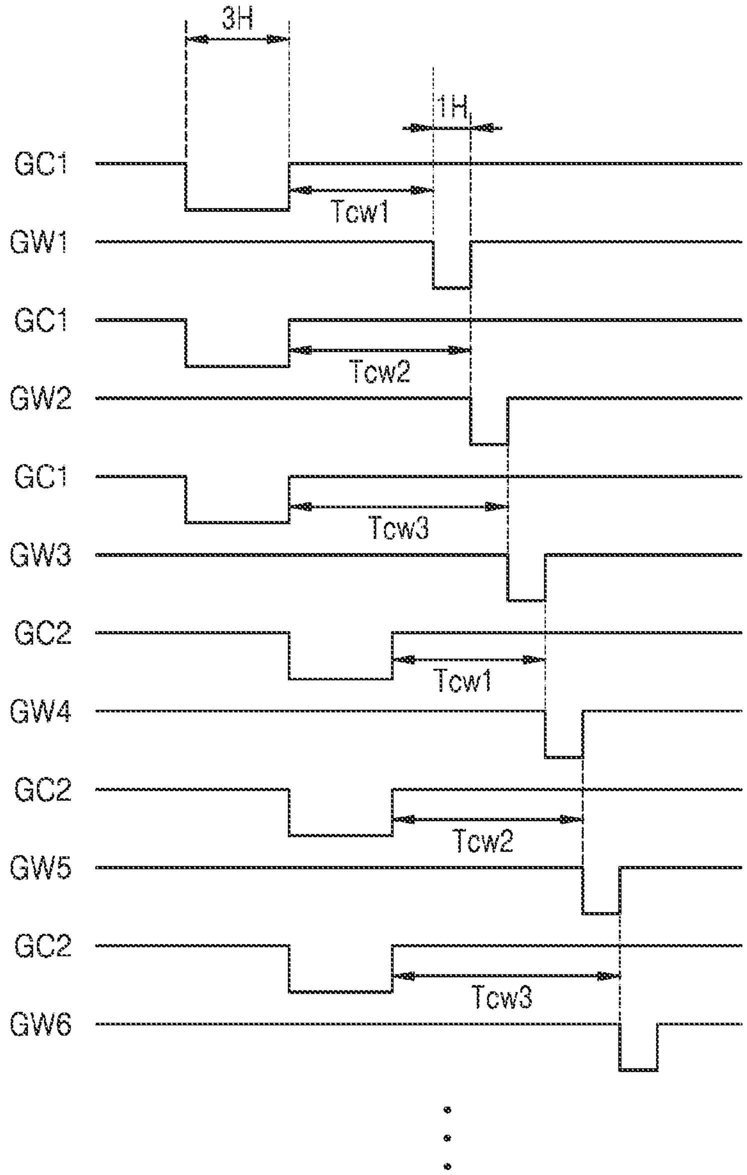
FIG. 11 is a view for explaining a signal interval between a second gate signal and a first gate signal according to an embodiment.

FIG. 9 is a signal timing diagram and FIG. 10 is a graph for illustrating an example of how a brightness difference may occur between pixels of different rows, according to a signal interval between a second gate signal and a first gate signal. FIG. 11 is another signal timing diagram for explaining a signal interval between a second gate signal and a first gate signal according to an embodiment. In FIG. 9, six examples of a GC on-voltage pulse followed by a GW on-voltage pulse applied to a pixel are shown. FIG. 11 shows another example of a timing relationship between a GC on-voltage pulse and a GW on-voltage pulse, but depicted in different lines. FIG. 10 is a graph of brightness difference measured using a just noticeable difference (JND) model in 255 grayscales 255G and 127 grayscales 127G. A horizontal axis of FIG. 10 is a signal interval between a second gate signal GC and a first gate signal GW, and a vertical axis represents JND values.

As shown in 10, when a signal interval between a second gate signal GC and a first gate signal GW is increased by 1H between pixels of adjacent rows (assuming the same DATA is applied to these pixels), as in FIG. 9, a brightness difference between the pixels differs by an amount depending on the signal interval between GC and GW. When the signal interval is 1H, a brightness difference in JND may be unacceptably high (6.3 for 255 G, 9.2 for 127 G). On the other hand, when the signal interval is 4H, a brightness difference in JND may be satisfactory (0.3 for 255 G, 1.0 for 127 G).

Because a signal interval between a second gate signal GC and a first gate signal GW is different for each row, a brightness difference between lines occurs and a small horizontal line may occur in images. In an embodiment, visibility of small horizontal lines may be reduced to an imperceptible level by setting a signal interval between a second gate signal GC and a first gate signal GW to be 4H or more, and reducing a brightness difference between rows that would otherwise occur if lower signal intervals are set.

FIG. 11 is a timing diagram for explaining a signal interval between a second gate signal and a first gate signal according to an embodiment. FIG. 11 shows, as an example, a first second gate signal GC1 and first to third first gate signals GW1, GW2, and GW3 in the first to third rows, and a second second gate signal GC2 and fourth to sixth first gate signals GW4, GW5, and GW6 in the fourth to sixth rows.

A first second gate signal GC1 may be simultaneously supplied to the second gate lines arranged in three rows. A second second gate signal GC2 may be shifted by 3H from a first second gate signal GC1, and simultaneously supplied to the second gate lines arranged in the next three rows. A first second gate signal GC1 and a second second gate signal GC2 may each have an on-time of 3H. First to sixth first gate signals GW1, GW2, GW3, GW4, GW5, and GW6 may be shifted by 1H and sequentially supplied to the first gate lines in the first to sixth rows.

As shown in FIG. 11, in a signal interval between a second gate signal GC (any of GC1, GC2, etc.) and a first gate signal GW (any of GW1, GW2, etc.), a first signal interval $T_{CW1}$ of 4H or more, a second signal interval $T_{CW2}$ which is a sum of the first signal interval $T_{CW1}$ and 1H, and a third signal interval $T_{CW3}$ which is a sum of the second signal interval $T_{CW2}$ and 1H may be repeated in units of three rows. Because the first signal interval $T_{CW1}$, the second signal interval $T_{CW2}$, and the third signal interval $T_{CW3}$ are each 4H or more, visibility of small horizontal lines may be reduced to an imperceptible level by reducing a brightness difference between lines. Thus, with the grouping technique herein by which individual stages of a gate driving circuit apply the same second gate signal GC to a group of rows simultaneously, in conjunction with proper setting of the signal intervals between gate signals GC and GW, the number of stages within a gate driving circuit are reduced while image quality is not perceptibly affected.

In other embodiments, signal intervals differing from 4H may be set, which may produce satisfactory image quality results in other applications. For instance, if a slight reduction in image quality can be tolerated, the signal intervals may be set to 3H. On the other hand, if even further imperceptibility is desired, the signal intervals may be set to 5H or higher.

Figure 12:
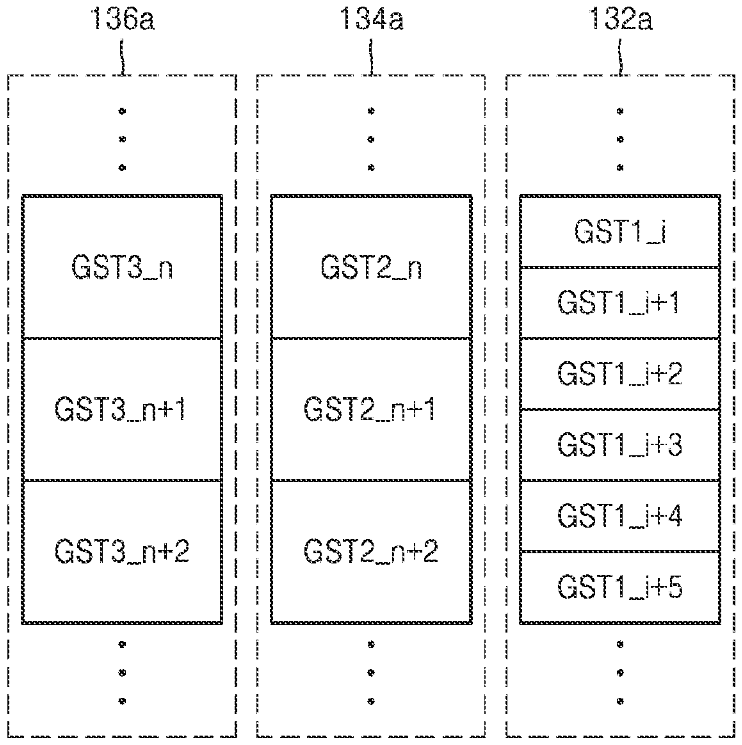
FIGS. 12 and 13 are schematic views of stages of a gate driving circuit according to an embodiment.
Figure 13:
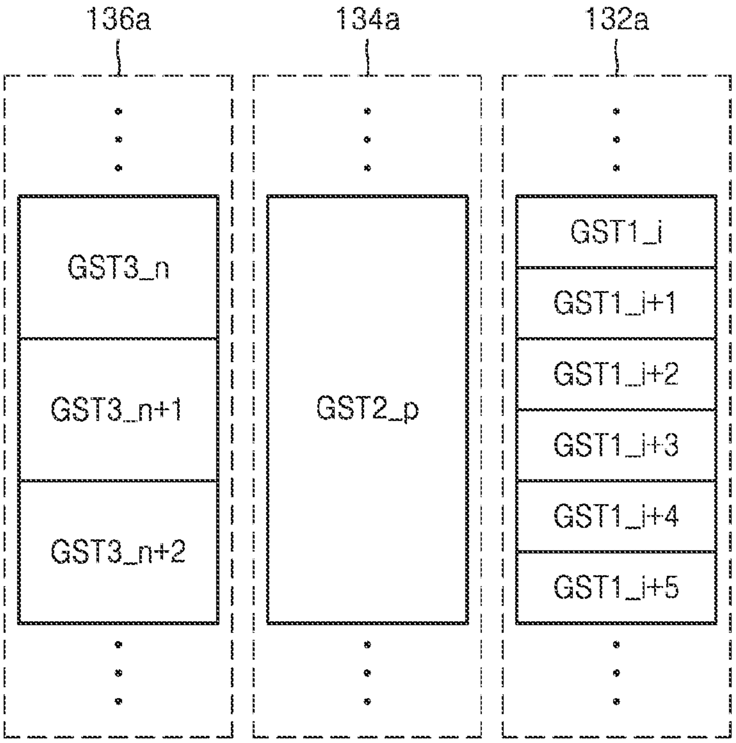

FIGS. 12 and 13 are schematic views of modified examples of stages of the gate driving circuit according to an embodiment.

In an embodiment shown in FIGS. 6A and 7, the second stages of the second gate driving circuit 134*a*: may each be provided to correspond to three rows; are configured to generate a second gate signal GC having an on-time of 3H using two clock signals, and supply the same to the second gate lines GCL arranged in the three rows. In other embodiments, the second stages of the second gate driving circuit 134*a* may each be provided to correspond to two or more rows, such as two rows, four rows, five rows, and the like, and the pixels arranged in two or more rows may share a second gate signal GC.

As an example, as shown in FIG. 12, the second stages . . . , GST2_*n*, GST2_*n*+1, GST2_*n*+2, . . . of the second gate driving circuit 134*a* may each be provided to correspond to two rows. The second stages . . . , GST2_*n*, GST2_*n*+1, GST2_*n*+2, . . . may each be configured to generate a second gate signal GC having an on-time of 2H using two clock signals and supply the same to the second gate lines GCL arranged in the two rows.

Alternatively, as shown in FIG. 13, the second stages . . . , GST2_*p*, . . . of the second gate driving circuit 134*a* may each be provided to correspond to six rows. The second stages . . . , GST2_*p*, . . . may each be configured to generate a second gate signal GC having an on-time of 6H using two clock signals and supply the same to the second gate lines GCL arranged in the six rows.

Figure 14:
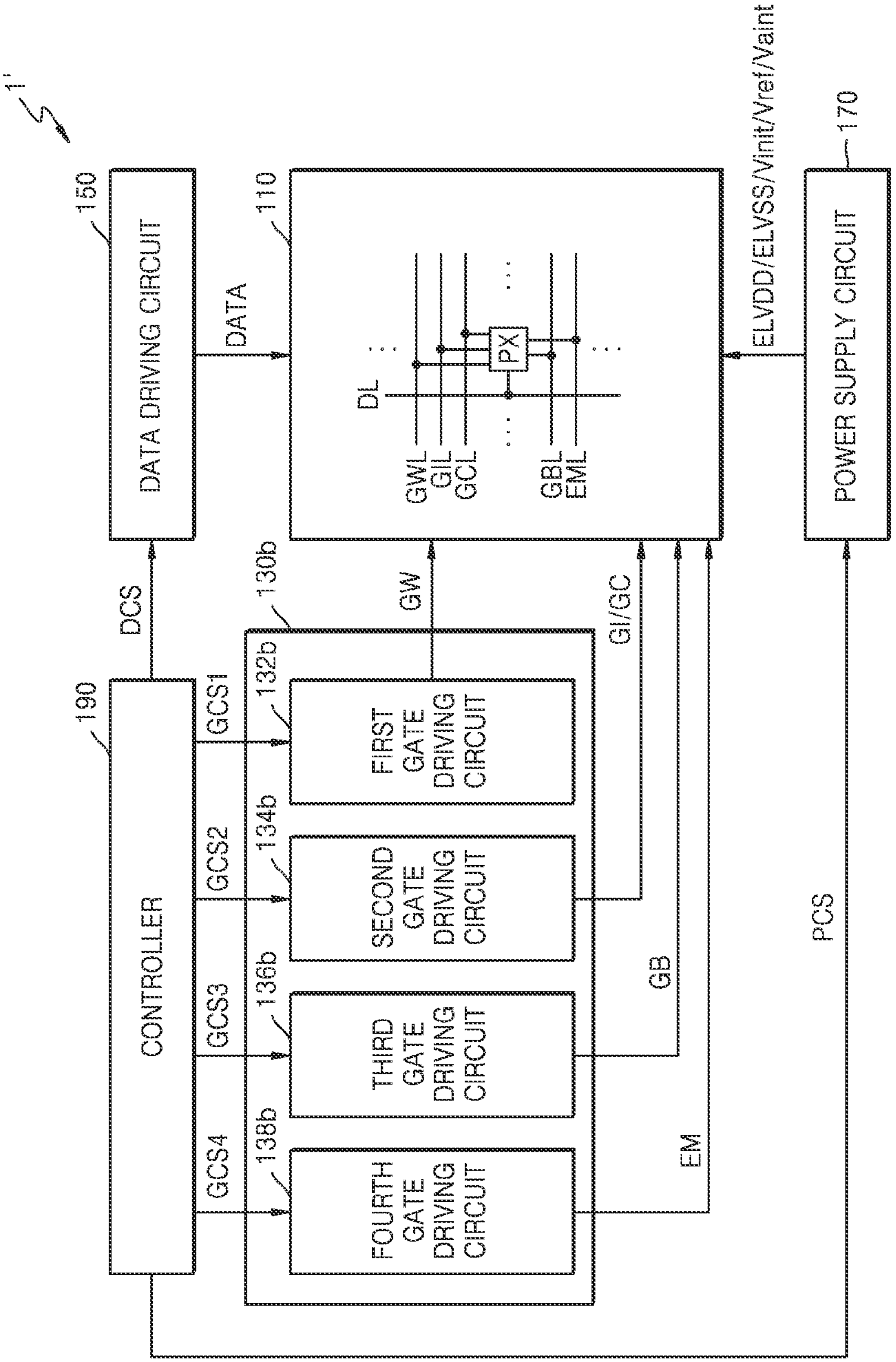
FIG. 14 is a schematic view of a display apparatus according to an embodiment.
Figure 15:
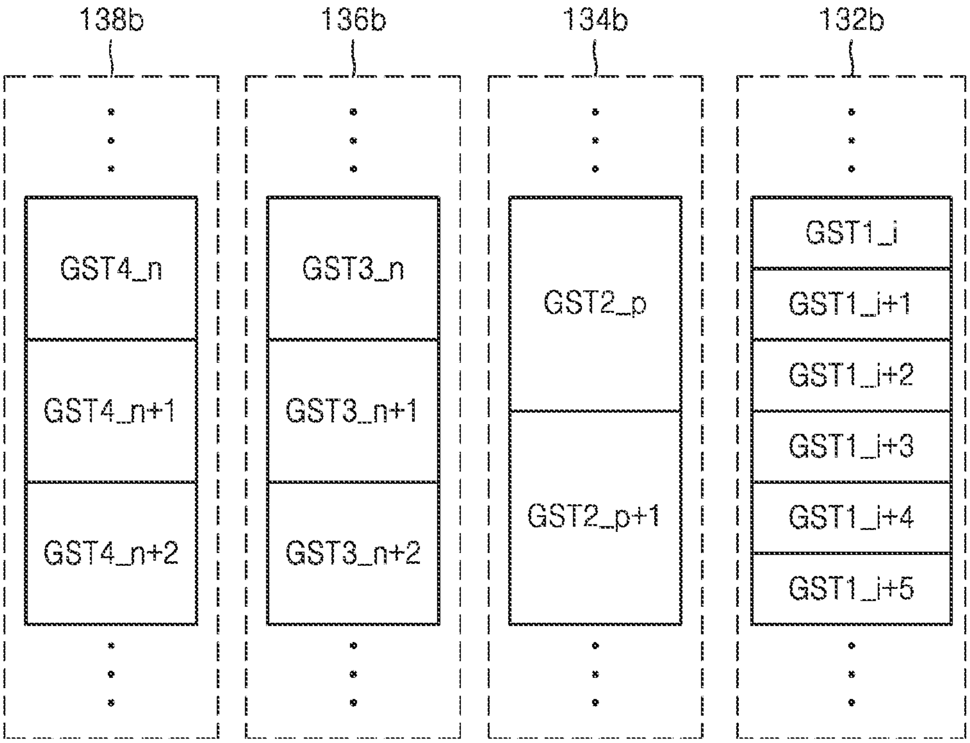
FIG. 15 is a schematic view of stages of a gate driving circuit shown in FIG. 14.

FIG. 14 schematically illustrates a display apparatus, 1', according to an embodiment. FIG. 15 is a schematic view of stages of the gate driving circuit shown in FIG. 14.

Referring to FIG. 14, the display apparatus 1' differs from display apparatus 1 described above by including a gate driving circuit 130*b* having four gate driving circuits. The display apparatus 1' may further include the pixel portion 110, the data driving circuit 150, the power supply circuit 170, and the controller 190. Hereinafter, redundant descriptions of the same elements as those of the display apparatus 1 shown in FIG. 1 are omitted and differences are mainly described.

The gate driving circuit 130*b* may include a first gate driving circuit 132*b*, a second gate driving circuit 134*b*, a third gate driving circuit 136*b*, and a fourth gate driving circuit 138*b*. The gate driving circuit 130*b* is different from the gate driving circuit 130*a* shown in FIG. 1. The gate driving circuit 130*b* shown in FIG. 14 includes a driving circuit configured to generate a second gate signal GC and a driving circuit configured to generate a fourth gate signal GB separately.

The first gate driving circuit 132*b* may be connected to the plurality of first gate lines GWL and configured to sequentially output first gate signals GW according to a first control signal GCS1. As shown in FIG. 15, the first gate driving circuit 132*b* may include the plurality of first stages . . . , GST1_*i*, GST1_*i*+1, GST1_*i*+2, GST1_*i*+3, GST1_*i*+4, GST1_*i*+5, . . . corresponding to each row. The plurality of first stages . . . , GST1_*i*, GST1_*i*+1, GST1_*i*+2, GST1_*i*+3, GST1_*i*+4, GST1_*i*+5 . . . may each be configured to generate a first gate signal GW and output the same to the first gate line GWL arranged in a row corresponding thereto.

The second gate driving circuit 134*b* may be connected to the plurality of second gate lines GCL and the plurality of third gate lines GIL. The second gate driving circuit 134*b* may be configured to sequentially output second gate signals GC and sequentially output third gate signals GI according to a second control signal GCS2. As shown in FIG. 15, the second gate driving circuit 134*b* may include a plurality of second stages . . . , GST2_*p*, GST2_*p*+1, . . . corresponding to three rows. Each of the plurality of second stages . . . , GST2_*p*, GST2_*p*+1, . . . may be configured to generate a second gate signal GC and a third gate signal GI and output the same to the second gate lines GCL and the third gate lines GIL arranged in three rows corresponding thereto.

The third gate driving circuit 136*b* may be connected to the plurality of fourth gate lines GBL. The third gate driving circuit 136*b* may be configured to sequentially output fourth gate signals GB according to a third control signal GCS3. As shown in FIG. 15, the third gate driving circuit 136*b* may include a plurality of third stages . . . , GST3_*n*, GST3_*n*+1, GST3_*n*+2 . . . corresponding to two rows. Each of the plurality of third stages . . . , GST3_*n*, GST3_*n*+1, GST3_*n*+2 . . . may be configured to generate a fourth gate signal GB and output the same to the fourth gate lines GBL arranged in two rows corresponding thereto.

The fourth gate driving circuit 138*b* may be connected to the plurality of fifth gate lines EML and configured to sequentially output fifth gate signals EM according to a fourth control signal GCS4. As shown in FIG. 15, the fourth gate driving circuit 138*b* may include a plurality of fourth stages . . . , GST4_*n*, GST4_*n*+1, GST4_*n*+2 . . . corresponding to two rows. Each of the plurality of fourth stages . . . GST4_*n*, GST4_*n*+1, GST4_*n*+2 . . . may be configured to generate a fifth gate signal EM and output the same to the fifth gate lines EML arranged in two rows corresponding thereto.

Figure 16:
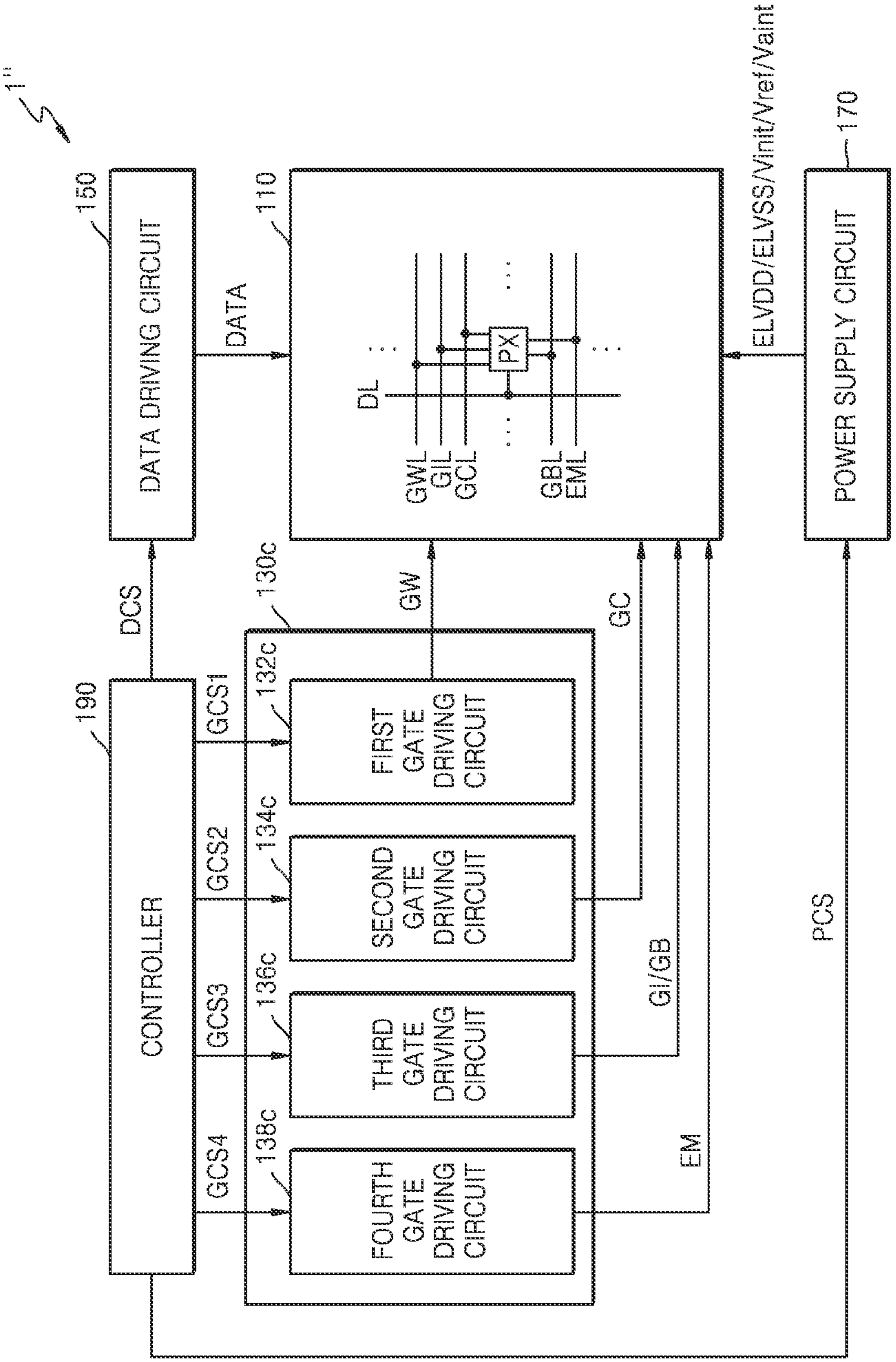
FIG. 16 is a schematic view of a display apparatus according to an embodiment.
Figure 17:
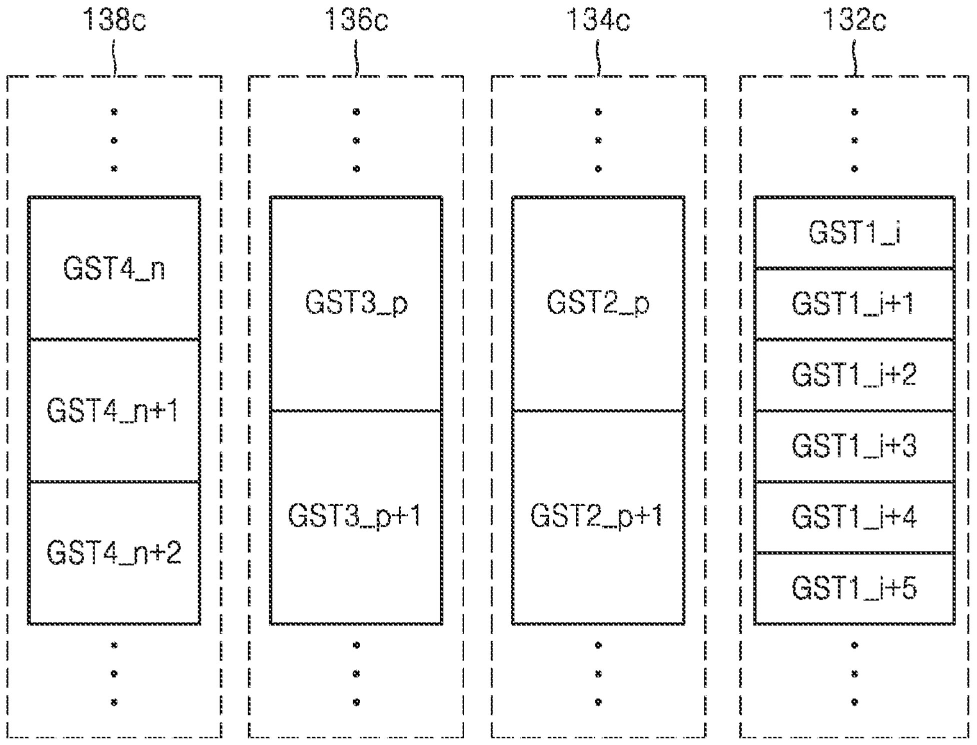
FIG. 17 is a schematic view of stages of a gate driving circuit shown in FIG. 16.

FIG. 16 schematically illustrates a display apparatus, 1", according to an embodiment. FIG. 17 is a schematic view of stages of a gate driving circuit 130*c* shown in FIG. 16. The display apparatus 1", like the display apparatus 1' of FIG. 4, includes four gate driving circuits, but differs from the display apparatus 1' in that a second gate driving circuit 134*c* generates and outputs just the second gate signal GC (but not GI), and a third gate driving circuit 136$c$ generates and outputs gate signals GI and GB.

The display apparatus 1" may include the pixel portion 110, a gate driving circuit 130$c$, the data driving circuit 150, the power supply circuit 170, and the controller 190. Hereinafter, redundant descriptions of the same elements as those of the display apparatus 1 shown in FIG. 1 are omitted and differences are mainly described.

The gate driving circuit 130$c$ may include a first gate driving circuit 132$c$, the second gate driving circuit 134$c$, the third gate driving circuit 136$c$, and a fourth gate driving circuit 138$c$. The gate driving circuit 130$c$ is different from the gate driving circuit 130$a$ shown in FIG. 1. The gate driving circuit 130$c$ shown in FIG. 16 includes a driving circuit configured to generate a second gate signal GC and a driving circuit configured to generate a fourth gate signal GB separately.

The first gate driving circuit 132$c$ may be connected to the plurality of first gate lines GWL and configured to sequentially output first gate signals GW according to a first control signal GCS1. As shown in FIG. 17, the first gate driving circuit 132$c$ may include the plurality of first stages . . . , GST1_$i$, GST1_$i$+1, GST1_$i$+2, GST1_$i$+3, GST1_$i$+4, GST1_$i$+5, . . . corresponding to each row. The plurality of first stages . . . , GST1_$i$, GST1_$i$+1, GST1_$i$+2, GST1_$i$+3, GST1_$i$+4, GST1_$i$+5 . . . may each be configured to generate a first gate signal GW and output the same to the first gate line GWL arranged in a row corresponding thereto.

The second gate driving circuit 134$c$ may be connected to the plurality of second gate lines GCL. The second gate driving circuit 134$b$ may be configured to sequentially output second gate signals GC according to a second control signal GCS2. As shown in FIG. 17, the second gate driving circuit 134$b$ may include the plurality of second stages . . . , GST2_$p$, GST2_$p$+1, . . . corresponding to three rows. Each of the plurality of second stages . . . , GST2_$p$, GST2_$p$+1, . . . may be configured to generate a second gate signal GC and output the same to the second gate lines GCL arranged in three rows corresponding thereto.

The third gate driving circuit 136$c$ may be connected to the plurality of third gate lines GIL and the plurality of fourth gate lines GBL. The third gate driving circuit 136$c$ may be configured to sequentially output third gate signals GI and sequentially output fourth gate signals GB according to a third control signal GCS3. As shown in FIG. 17, the third gate driving circuit 136$c$ may include the plurality of third stages . . . , GST3_$p$, GST3_$p$+1, . . . corresponding to three rows. Each of the plurality of third stages . . . , GST3_$p$, GST3_$p$+1, . . . may be configured to generate a third gate signal GI and a fourth gate signal GB and output the same to the third gate lines GIL and the fourth gate lines GBL arranged in three rows corresponding thereto.

The fourth gate driving circuit 138$c$ may be connected to the plurality of fifth gate lines EML and configured to sequentially output fifth gate signals EM according to a fourth control signal GCS4. As shown in FIG. 17, the fourth gate driving circuit 138$c$ may include a plurality of fourth stages . . . , GST4_$n$, GST4_$n$+1, GST4_$n$+2 . . . corresponding to two rows. Each of the plurality of fourth stages . . . GST4_$n$, GST4_$n$+1, GST4_$n$+2 . . . may be configured to generate a fifth gate signal EM and output the same to the fifth gate lines EML arranged in two rows corresponding thereto.

In the display apparatus according to the embodiments of FIGS. 14 to 17, because the driving circuit configured to generate a second gate signal GC and the driving circuit configured to generate a fourth gate signal GB are provided separately, initialization of the organic light-emitting diode by a fourth gate signal GB may be performed independently of compensation of the driving transistor by a second gate signal GC.

The pixel to which the gate driving circuit according to the embodiments is applied is not limited to the design of the pixel circuit shown in FIG. 2, and the number of transistors, the number of capacitors, and the circuit design may be variously changed. As an example, as long as it is a pixel circuit of a pixel that includes a transistor (e.g., the second transistor T2) configured to receive a data signal from a data line, a driving transistor (e.g., the first transistor T1), and a transistor (e.g., the third transistor T3) configured to compensate a threshold voltage of the driving transistor, and a write-period in which data is written is separated from a compensation period in which the threshold voltage of the driving transistor is compensated, other transistors and capacitors may be added and/or omitted.

The display apparatus according to an embodiment may be an organic light-emitting display apparatus, an inorganic light-emitting display apparatus or a quantum-dot light-emitting display apparatus.

One or more embodiments, such as those described above, may provide a display apparatus with a reduced dead space, reduced circuitry, and/or reduced power consumption (due to the reduced circuitry) while achieving the same or substantially the same image quality compared to related art display apparatus. Effects of the disclosure are not limited to the above effects but may variously extend without departing from the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:

a plurality of first gate lines respectively arranged in a plurality of rows;

a plurality of second gate lines respectively arranged in the plurality of rows;

a first gate driving circuit including a plurality of first stages, wherein the plurality of first stages are configured to sequentially output first gate signals during a write-period of a frame period in which data signals are applied; and a second gate driving circuit including a plurality of second stages, wherein the plurality of second stages are configured to sequentially output second gate signals during a compensation period of the frame period, in which a threshold voltage of a driving transistor is compensated, wherein each of the plurality of first stages outputs a first gate signal among the first gate signals to the first gate line in a respective single row, and each of the plurality of second stages simultaneously outputs a second gate signal among the second gate signals to second gate lines arranged in two or more rows, and respective ones of the first gate signals applied to the two or more rows are an off-voltage and the second gate signal applied to the two or more rows is an on-voltage during the compensation period.

2. The display apparatus of claim 1, wherein, in the frame period, the write-period is subsequent to the compensation period, and an interval between the second gate signal and the first gate signal is four horizonal periods (H) or more.

3. The display apparatus of claim 1, wherein each of the plurality of second stages corresponds to three rows, and the second gate signal has an on-time of three horizontal periods (H), is shifted by 3H between adjacent ones of the second stages, and then output.

4. The display apparatus of claim 3, wherein the first gate signal has an on-time of 1H, is shifted by an interval of 1H, and then output.

5. The display apparatus of claim 1, further comprising a pair of clock lines connected to the second stages.

6. The display apparatus of claim 1, further comprising a plurality of pixels respectively arranged in the plurality of rows, wherein each of the plurality of pixels includes:

the driving transistor;

a first transistor including a gate connected to the first gate line, the first transistor being connected to a data line; and a second transistor including a gate connected to the second gate line, the second transistor being connected between a gate of the driving transistor and one terminal of the driving transistor.

7. The display apparatus of claim 1, further comprising a plurality of third gate lines respectively arranged in the plurality of rows, wherein the plurality of second stages are configured to sequentially output third gate signals during a first initialization period of the frame period, in which a gate of the driving transistor is initialized, and a third gate signal output by each of the plurality of second stages is simultaneously supplied to third gate lines arranged in two or more rows corresponding thereto.

8. The display apparatus of claim 7, wherein, in the frame period, the compensation period is subsequent to the first initialization period.

9. The display apparatus of claim 7, further comprising a plurality of fourth gate lines respectively arranged in the plurality of rows, wherein the plurality of second stages are configured to sequentially output fourth gate signals during a second initialization period of the frame period, in which a light-emitting diode is initialized, and a fourth gate signal output by each of the plurality of second stages is simultaneously supplied to the fourth gate lines arranged in two or more rows corresponding thereto.

10. The display apparatus of claim 9, wherein, during the frame period, a fourth gate signal output in the second initialization period overlaps a second gate signal output in the compensation period.

11. The display apparatus of claim 9, further comprising:

a plurality of fifth gate lines respectively arranged in the plurality of rows; and a third gate driving circuit including a plurality of third stages, wherein the plurality of third stages are configured to sequentially output fifth gate signals during a light-emission period in the frame period, wherein each of the plurality of third stages corresponds to two or more rows, and a fifth gate signal output by each of the plurality of third stages is simultaneously supplied to the fifth gate lines arranged in two or more rows corresponding thereto.

12. The display apparatus of claim 7, further comprising:

a plurality of fourth gate lines respectively arranged in the plurality of rows; and a third gate driving circuit including a plurality of third stages, wherein the plurality of third stages are configured to sequentially output fourth gate signals during a second initialization period of the frame period, in which a light-emitting diode is initialized, wherein each of the plurality of third stages corresponds to two or more rows, and a fourth gate signal output by each of the plurality of third stages is simultaneously supplied to fourth gate lines arranged in two or more rows corresponding thereto.

13. The display apparatus of claim 1, further comprising:

a plurality of third gate lines respectively arranged in the plurality of rows; and a third gate driving circuit including a plurality of third stages, wherein the plurality of third stages are configured to sequentially output third gate signals during a first initialization period of the frame period, in which a gate of the driving transistor is initialized, wherein each of the plurality of third stages corresponds to two or more rows, and a third gate signal output by each of the plurality of third stages is simultaneously supplied to third gate lines arranged in two or more rows corresponding thereto.

14. The display apparatus of claim 13, further comprising a plurality of fourth gate lines respectively arranged in the plurality of rows, wherein the plurality of third stages are configured to sequentially output fourth gate signals during a second initialization period of the frame period, in which a light-emitting diode is initialized, and a fourth gate signal output by each of the plurality of third stages is simultaneously supplied to the fourth gate lines arranged in two or more rows corresponding thereto.

15. A display apparatus comprising:

a plurality of first gate lines respectively arranged in a plurality of rows;

a plurality of second gate lines respectively arranged in the plurality of rows;

a first gate driving circuit including a plurality of first stages, wherein the plurality of first stages are configured to sequentially output first gate signals during a write-period of a frame period in which data signals are applied; and a second gate driving circuit including a plurality of second stages, wherein the plurality of second stages are configured to sequentially output second gate signals during a compensation period of the frame period, in which a threshold voltage of a driving transistor is compensated, wherein each of the plurality of first stages outputs a first gate signal among the first gate signals to a respective single row, and each of the plurality of second stages simultaneously outputs a second gate signal among the second gate signals to second gate lines arranged in two or more rows, wherein, in the two or more rows, intervals between the first gate signal supplied to the first gate line and the second gate signal supplied to the second gate line are different from each other.

16. A display apparatus comprising:

a plurality of first gate lines respectively arranged in a plurality of rows;

a plurality of second gate lines respectively arranged in the plurality of rows;

a plurality of third gate lines respectively arranged in the plurality of rows;

a first gate driving circuit including a plurality of first stages, wherein the plurality of first stages are configured to sequentially output first gate signals during a write-period of a frame period, in which data signals are applied;

a second gate driving circuit including a plurality of second stages, wherein the plurality of second stages are configured to sequentially output second gate signals during a compensation period of the frame period, in which a threshold voltage of a driving transistor is compensated; and a third gate driving circuit including a plurality of third stages, wherein the plurality of third stages are configured to sequentially output third gate signals during a light-emission period of the frame period, wherein, each of the plurality of first stages outputs a first gate signal to a first gate line in a respective single row, each of the plurality of second stages simultaneously supplies a second gate signal to second gate lines in two or more rows, and each of the plurality of third stages simultaneously supplies a third gate signal to third gate lines in two or more rows, wherein a number of rows to which each of the plurality of second stages corresponds is greater than a number of rows to which each of the plurality of third stages corresponds.

17. The display apparatus of claim 16, further comprising a plurality of fourth gate lines respectively arranged in the plurality of rows, wherein the plurality of second stages are configured to sequentially output fourth gate signals during a first initialization period of the frame period, in which a gate of the driving transistor is initialized, and a fourth gate signal output by each of the plurality of second stages is simultaneously supplied to the fourth gate lines arranged in two or more rows corresponding thereto.

18. The display apparatus of claim 17, further comprising a plurality of fifth gate lines respectively arranged in the plurality of rows, wherein the plurality of second stages are configured to sequentially output fifth gate signals during a second initialization period of the frame period, in which a light-emitting diode is initialized, and a fifth gate signal output by each of the plurality of second stages is simultaneously supplied to the fifth gate lines arranged in two or more rows corresponding thereto.

* * * * *